(12) United States Patent
Abe

(10) Patent No.: US 7,418,549 B2
(45) Date of Patent: Aug. 26, 2008

(54) STORAGE SYSTEM WITH DISK ARRAY CONTROLLERS THAT INDEPENDENTLY MANAGE DATA TRANSFER

(75) Inventor: Tetsuya Abe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 10/769,303

(22) Filed: Jan. 30, 2004

(65) Prior Publication Data

US 2005/0033912 A1   Feb. 10, 2005

(30) Foreign Application Priority Data

Aug. 5, 2003   (JP) .............................. 2003-287067

(51) Int. Cl.
*G06F 12/00* (2006.01)
(52) U.S. Cl. .......................................... 711/114; 714/6
(58) Field of Classification Search .......... 711/112–114
See application file for complete search history.

(56) References Cited

U.S. PATENT DOCUMENTS

| | | | |
|---|---|---|---|
| 5,155,845 A | 10/1992 | Beal et al. | |
| 5,584,008 A | 12/1996 | Shimada et al. | |
| 5,905,995 A * | 5/1999 | Tabuchi et al. .............. | 711/114 |
| 6,098,129 A | 8/2000 | Fukuzawa | |
| 6,101,497 A | 8/2000 | Ofek | |
| 6,209,002 B1 | 3/2001 | Gagne et al. | |
| 6,327,614 B1 | 12/2001 | Asano et al. | |
| 6,421,711 B1 | 7/2002 | Blumenau et al. | |
| 6,446,141 B1 | 9/2002 | Nolan et al. | |
| 6,453,354 B1 | 9/2002 | Jiang et al. | |
| 6,457,109 B1 | 9/2002 | Millilo et al. | |
| 6,484,229 B1 | 11/2002 | Ichikawa et al. | |
| 6,553,408 B1 | 4/2003 | Merrell et al. | |
| 6,587,935 B2 | 7/2003 | Ofek | |
| 6,640,278 B1 | 10/2003 | Nolan et al. | |

(Continued)

FOREIGN PATENT DOCUMENTS

EP   0723234 B1   7/2001

(Continued)

OTHER PUBLICATIONS

Ji, et al., "Seneca: Remote Mirroring Done Write," Jun. 2003, Proceedings of USENIX Technical Conference, pp. 253-268.*

(Continued)

*Primary Examiner*—Kevin Ellis
*Assistant Examiner*—Matthew Bradley
(74) *Attorney, Agent, or Firm*—Townsend and Townsend and Crew LLP

(57) ABSTRACT

A disk storage system is disclosed, in which disk storage units themselves can autonomously transmit data to complement storage of data between the disk storage units without provision of an exclusive device for managing those disk storage units. The disk storage system includes a disk array system. The disk storage units are connected to one or more host computers and to at least two other disk storage units, the disk storage units comprising a data transmission means for executing the processing of transmission of data between them and the other disk storage units, and a connecting adapter retaining management information of data having been subjected to transmission processing by the data transmission means.

17 Claims, 24 Drawing Sheets

U.S. PATENT DOCUMENTS

| | | |
|---|---|---|
| 6,697,367 B1 | 2/2004 | Halstead et al. |
| 6,754,769 B2 * | 6/2004 | Kawano .................... 711/114 |
| 6,757,792 B2 | 6/2004 | Morishita et al. |
| 6,763,442 B2 | 7/2004 | Arakawa et al. |
| 6,983,349 B2 * | 1/2006 | Okumoto et al. ............ 711/147 |
| 2001/0050915 A1 | 12/2001 | O'Hare et al. |
| 2002/0004890 A1 | 1/2002 | Ofek et al. |
| 2002/0040413 A1 | 4/2002 | Okada et al. |
| 2002/0152362 A1 * | 10/2002 | Cochran .................... 711/162 |
| 2002/0194428 A1 | 12/2002 | Green |
| 2003/0105931 A1 | 6/2003 | Weber et al. |
| 2003/0163553 A1 | 8/2003 | Kitamura et al. |
| 2003/0177330 A1 | 9/2003 | Idei et al. |
| 2003/0191890 A1 | 10/2003 | Okamoto et al. |
| 2003/0229757 A1 | 12/2003 | Hosoya et al. |
| 2003/0229764 A1 | 12/2003 | Ohno et al. |
| 2004/0073831 A1 | 4/2004 | Yanai et al. |
| 2004/0083338 A1 | 4/2004 | Moriwaki et al. |
| 2004/0098547 A1 | 5/2004 | Ofek et al. |
| 2004/0103244 A1 | 5/2004 | Fujimoto et al. |
| 2004/0139365 A1 | 7/2004 | Hosoya |
| 2004/0153914 A1 * | 8/2004 | El-Batal .................... 714/724 |
| 2004/0158652 A1 | 8/2004 | Obara |

FOREIGN PATENT DOCUMENTS

| | | |
|---|---|---|
| JP | 10-320261 | 12/1998 |
| JP | 11-073713 | 3/1999 |
| JP | 2003-345642 A | 12/2003 |

OTHER PUBLICATIONS

Nakajima et al. "Storage System: Management of Explosively Increasing Data in Mission-Critical Systems," NEC Journal of Advanced Technology 1:125-132 (2004).

* cited by examiner

FIG.10

| HOST LOGICAL ADDRESS (LU#) | IN-UNIT LOGICAL ADDRESS (LU#) | BLK# | MANAGEMENT SOURCE DEVICE ID | PROTECT FLAG INFORMATION |
|---|---|---|---|---|
| 0 | 0 | 00000-00fff | 00 | 01 |
| 0 | 0 | 01000-01fff | 00 | 01 |
| ... | ... | ... | 00 | 00 |
| 25 | 35 | 00000-02fff | 01 | 00 |
| 25 | 35 | 03000-08fff | 01 | 00 |
| 25 | 35 | 00000-01fff | 01 | 00 |
| 26 | 36 | ... | 00 | 00 |
| 26 | ... | ... | 00 | 00 |
| ... | ... | ... | 02 | 00 |

FIG.14

1111 BETWEEN-UNIT DATA ADDRESS FORMAT

| HOST LOGIC ID | DATA LENGTH INFORMATION | TRANSMISSION DESTINATION ADDRESS | | TRANSMISSION SOURCE ADDRESS | | MANAGEMENT SOURCE ADDRESS | |
|---|---|---|---|---|---|---|---|
| | | UNIT ID | TRANSMISSION DESTINATION LOGICAL ADDRESS | UNIT ID | TRANSMISSION SOURCE LOGICAL ADDRESS | UNIT ID | TRANSMISSION SOURCE LOGICAL ADDRESS |

STORAGE SYSTEM WITH DISK ARRAY CONTROLLERS THAT INDEPENDENTLY MANAGE DATA TRANSFER

CROSS REFERENCE TO RELATED APPLICATION

Japanese Patent Application No. 2003-287067 filed in Japan on Aug. 5, 2003 to constitute an application, on which the present application is based, is referred herein to by way of reference.

FIELD OF THE INVENTION

The present application relates to a disk storage system, in which a plurality of disk storage units for dividing data to store the same in a plurality of magnetic drives are connected together, and more particular, to a technique of transmission of data between disk storage units.

BACKGROUND OF THE INVENTION

Large enterprises typified by banks, securities companies, telephone companies, and so on tend to reduce expenses required for operation, maintenance, and management of a computer system and a storage system by configuring the computer system and the storage system such that computers and storages, which have been conventionally dispersed in various placed, are concentrated in a data center, and it is specifically demanded that mainframe/high-end storage system support a channel interface for connection to several hundreds or more of host computers (connectivity) and storage capacity of several hundreds or more tera-bytes.

Furthermore, progress in information-oriented society has no bounds to a rapid increase in amount of communication and data. However, due to an unpredictable increase in amount of data, physical extension increases cost and labor required for operation, maintenance, and management of a storage system.

Hereupon, free system configurations meeting with various needs have recently been demanded of as a storage pool by needs of users, and among these configurations, it has been demanded to construct a virtual volume so as to make effective use of a vacant capacity between a plurality of storages.

Also, for the sake of maintenance, a demand has been made for extendability, such as flexibility or the like, enabling construction of highly reliable configuration modules, a clustered system, a highly available system produced by a system construction technique to combine them, and a system meeting customer's needs and enabling easily accommodating extension and configurational modification, and operativity of compressing a total storage capacity and facilitating extension and configurational modification.

Conventionally, there has been a structure, in which a plurality of host computers and disk storage units are connected to each other through a switch router as shown in, for example, FIG. 23 and a plurality of host computers and disk storage units are connected to each other through fiber channels as shown in, for example, FIG. 24.

Under present circumstances, extension of volume is not achieved until setting is modified and corrected on a user's side, but restrictions due to operating system (OS) and middle ware lead to damage to open quality and extension on a user's part, and in order to perform a flexible and dynamic modification on time, cost is small in operation when such modification is autonomously enabled on a storage unit side.

However, a conventional disk array system shown in FIG. 23 involves a problem that since correspondence between host computers and disk storage units is fundamentally 1 versus 1 and maintenance must be performed in respective units when a single disk storage unit is an obstacle to cause incapability of storage of data, or insufficiency of capacity causes incapability of storage of data, there is a need of modifying an address to a separate unit to change a data storage place, and a configuration shown in FIG. 24 involves a problem that while disaster recovery such as backup and restoration of a virtual volume is demanded in order to prevent a data center from being paralyzed due to sudden accidents, an increase in standing operating cost and complexity in management are made unavoidable by newly installing an increased groups of disk storage units and management units for managing them, or storage switches.

SUMMARY OF THE INVENTION

Hereupon, it is an object of the invention to provide a disk storage system, in which disk storage units themselves can autonomously transmit data to complement storage between the disk storage units without the provision of an exclusive device for managing those disk storage units, which constitute a disk array system.

A data management method according to the invention is one in a disk storage system comprising a plurality of disk storage units each comprising a plurality of host interfaces connected to host computers, disk interfaces connected to disk devices for storing data, a cache memory, which temporarily stores the data and to which access can be gained in common from the host interfaces and the disk interfaces, and switch means for connection of the host interfaces, the disk interfaces, and the cache memory, and wherein the plurality of disk storage units, respectively, retain information of the plurality of disk storage units in interfaces connecting between the plurality of disk storage units, and wherein each of the plurality of disk storage units themselves execute the processing of data transmission between the plurality of disk storage units and management information of data having been subjected to the processing of transmission is retained in the interfaces of each of the disk storage units.

Also, the invention provides a disk storage unit comprising a plurality of host interfaces connected to host computers, disk interfaces connected to disk devices for storing data, a cache memory, which temporarily stores the data and to which access can be gained in common from the host interfaces and the disk interfaces, and switch means for connection of the host interfaces, the disk interfaces, and the cache memory, and further comprising data transmission means connected to at least two other disk storage units to execute the processing of data transmission between it and the other disk storage units, and an interface for retaining information of the other disk storage units and a plurality of disk storage units connected consecutively to the other disk storage units, and management information of the data having been subjected to the processing of transmission by the data transmission means.

Also, the invention provides a disk storage system comprising a plurality of disk storage units each comprising a plurality of host interfaces connected to host computers, disk interfaces connected to disk devices for storing data, a cache memory, which temporarily stores the data and to which access can be gained in common from the host interfaces and the disk interfaces, and switch means for connection of the host interfaces, the disk interfaces, and the cache memory, and wherein the plurality of disk storage units, respectively, comprise data transmission means to execute the processing of data transmission between the plurality of disk storage units, and an interface for retaining information of the plurality of disk storage units and management information of data having been subjected to the processing of transmission by the data transmission means, and the plurality of disk storage units are connected to one another in loop via the interfaces.

According to the invention, storage of data can be complemented among the disk storage units without the provision of an exclusive device for managing those disk storage units, which constitute a disk storage system, and that disk storage unit, which cannot promptly accommodate an increase in data amount, rents a capacity from another disk storage unit, thereby enabling reducing deterioration in service.

Also, according to the invention, addresses and data can be also delivered in order between disk storage units and the respective disk storage units can relay and transmit data therebetween without the provision of any special switches between the disk storage units.

Also, according to the invention, a unique protocol can be carried out between the disk storage units without influence on hosts, the respective disk storage units can independently accede to demands from host computers while cooperating with one another, and it is possible to realize a relatively easy storage pool of inexpensive operating cost.

Also, according to the invention, when a disk storage unit operates as a relay unit, it monitors passing data and distributes and stores duplicated data and transmission log, whereby it is possible to expect an effect of lightening in backup.

BRIEF DESCRIPTION OF THE DRAWINGS

Preferred embodiments of the present invention will now be described in conjunction with the accompanying drawings, in which:

FIG. 10 is a view showing a management map for managing who is an owner of a volume within a one's own disk storage unit according to an embodiment of the invention;

FIG. 14 is a view showing a between-unit address format according to an embodiment of the invention;

DESCRIPTION OF THE PREFERRED EMBODIMENTS

An embodiment of the invention is described below in detail with reference to the drawings. In addition, the same members in all the drawings for illustration of the embodiment are denoted by the same characters, and a repeated explanation therefor is omitted.

Figure 1:
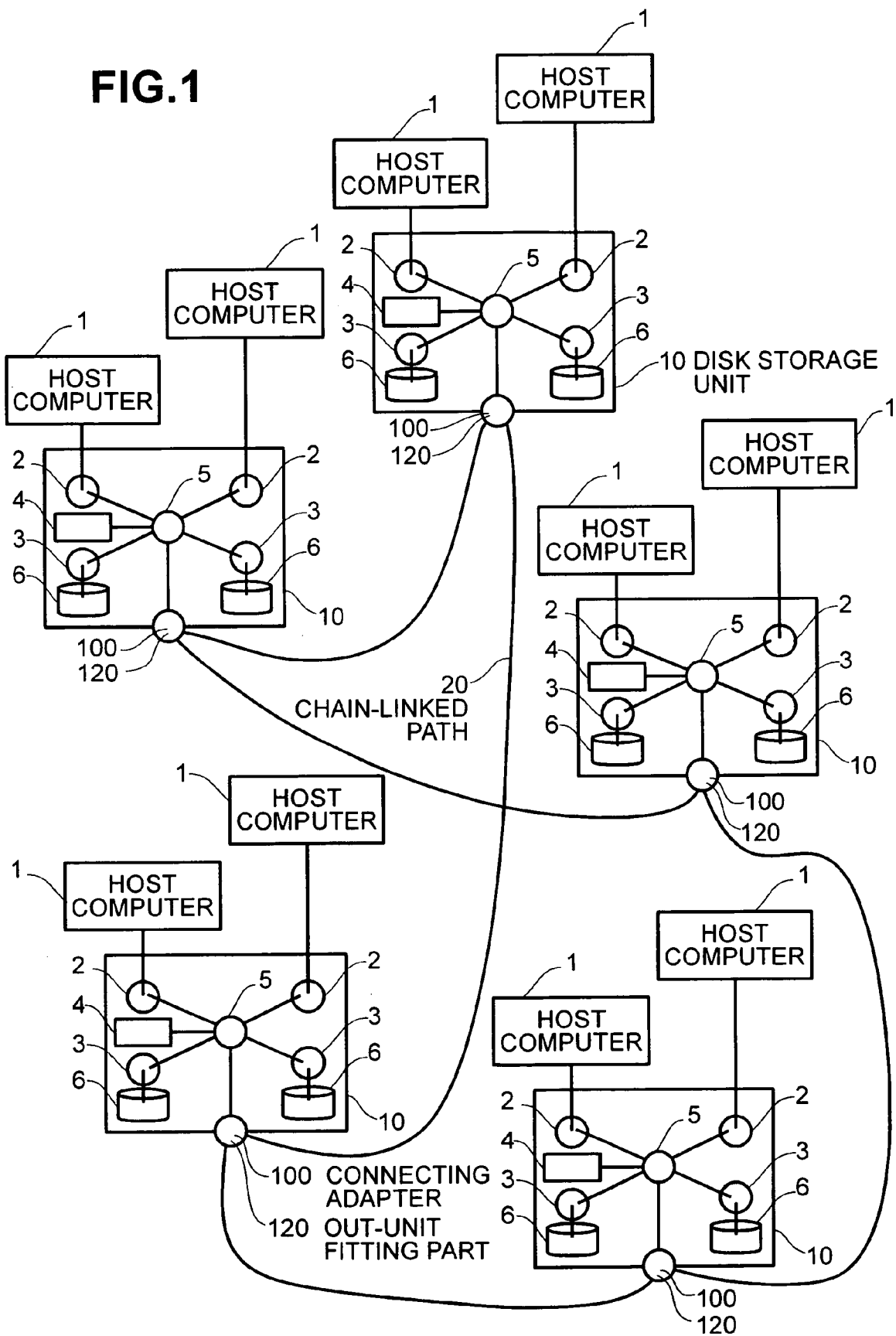
FIG. 1 is a configuration showing an example of a disk storage system according to an embodiment of the invention.
Figure 2:
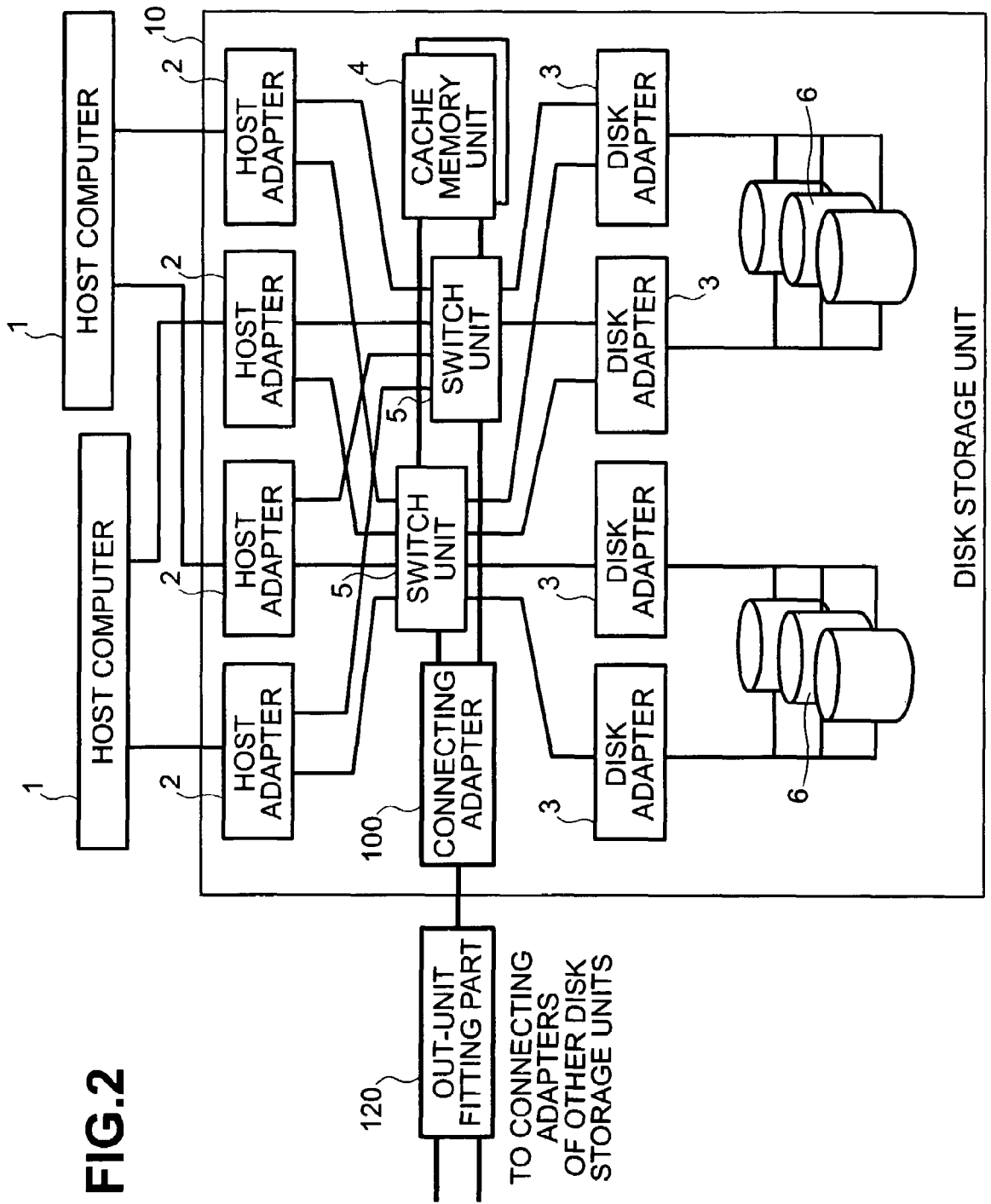
FIG. 2 is a configuration showing an example of a disk storage unit constituting the disk storage system according to the embodiment of the invention.

FIG. 1 is a configuration showing an example of a disk storage system according to an embodiment of the invention, and FIG. 2 is a configuration showing an example of a disk storage unit constituting the disk storage system.

In FIG. 1, the disk storage system comprises a plurality of disk storage units 10 connected to host computers 1 and to one another by means of chain-linked path 20.

Connector adapters 100 of the disk storage units 10 are connected as I/F control units between the disk storage units 10 and the chain-linked path 20 via out-unit fitting parts 120.

Also, the out-unit fitting parts 120 function to bypass the chain-linked paths 20 when the connecting adapters 100 are subjected to maintenance or cannot be used, so that such use as beforehand installing the out-unit fitting parts 120 and bypassing them until disk storage units 10 are additionally installed is possible and so an increase or reduction in the number of disk storage units 10 is facilitated.

Also, the connecting adapters 100 of the respective disk storage units 10 are connected to the respective chain-linked paths 20, which are joined with both adjacent disk storage units 10, via the out-unit fitting parts 120 and the chain-linked paths 20 are arranged to have at least paths of two routes as a whole. This is because access can be gained by exchanging a path by another one even when one of the chain-linked paths 20 between the disk storage units 10 fails, and according to the embodiment failure in the chain-linked paths 20 is coped with by relaying data among a plurality of disk storage units 10 to transmit the same.

In FIG. 2, the disk storage unit 10 comprises interface units (host adapters) 2 being two host interfaces to connect to the host computers 1, and interface units (disk adapters) 3 being four disk interfaces to connect to groups of magnetic disks 6. The reason why the respective groups of magnetic disks 6, respectively, connect to two disk adapters 3 is that a path having two routes are provided to afford gaining access to disks even when either of the disk adapters 3 fails.

Also, the host adapters 2 and the disk adapters 3 are connected via internal paths to cache memory units 4 through switch units 5 being switch means.

The reason why two switch units 5 are present is that an improvement in transmission band (performance) is achieved and access can be gained to the cache memory units 4 even when either of the switch units 5 fails.

Also, the cache memory units 4 house therein a plurality of memory modules and are used to temporarily store written data, which the host adapters 2 are to record on the groups of magnetic disks 6, in the case where the host computers 1 make a demand for writing on the groups of magnetic disks 6.

Also, in the case where the host computers 1 make a demand for reading, the host adapters 2 transmit data on the cache memory units 4 to the host computers 1 to decrease a response time without reading the data from the groups of magnetic disks 6, provided that the data are present in the cache memory units 4.

Also, the disk adapters 3 respond to the host adapters 2 to cause data from the groups of magnetic disks 6 to be stored (staging) in the cache memory units 4, or data from the cache memory units 4 to be stored (destaging) in the groups of magnetic disks 6.

Also, the disk adapters 3 can perform control to distribute data to a plurality of blocks to store the same in a plurality of disks among the groups of magnetic disks 6, and also can create parity redundant data to data to store the same in the groups of magnetic disks 6 and to restore the same. This indicates a technique generally called the disk array (RAID) technique.

The components described above are basic components of a disk storage unit singly installed, according to the embodiment the connecting adapters 100 making interfaces constituting components for connection between the disk storage units are newly installed, the switch units are enlarged in a manner to connect paths of the switch units 5 to the connecting adapters 100 to afford access to data in the cache memory units 4 via the switch units 5 from the connecting adapters 100, and the connecting adapters 100 are also connected to the chain-linked paths 20 via the out-unit fitting parts 120.

Subsequently, details of the switch units 5 and the connecting adapters 100 in the disk storage units 10 according to the embodiment are described.

Figure 3:
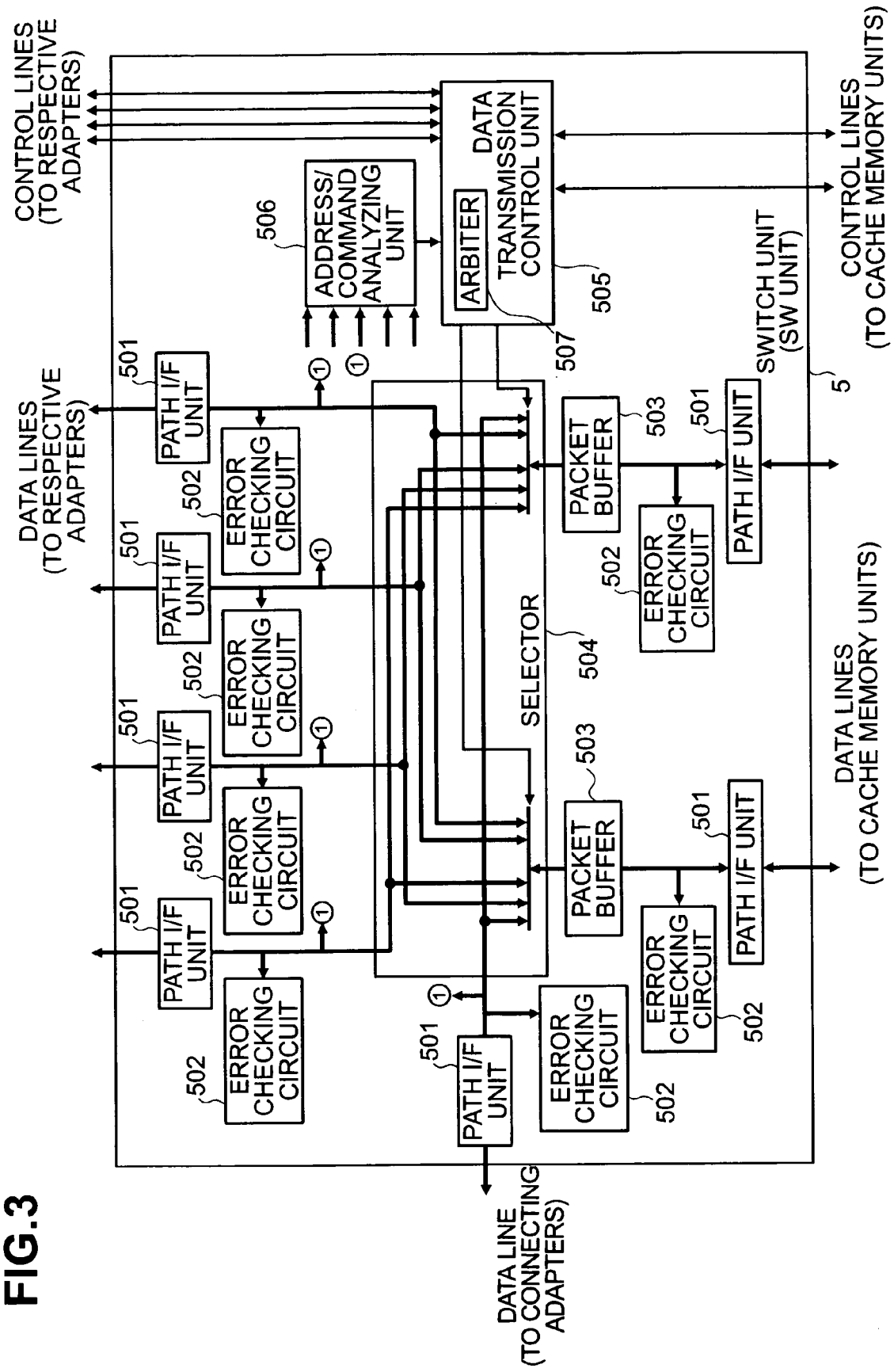
FIG. 3 is a configuration showing an example of a switch unit according to the embodiment of the invention.
Figure 4:
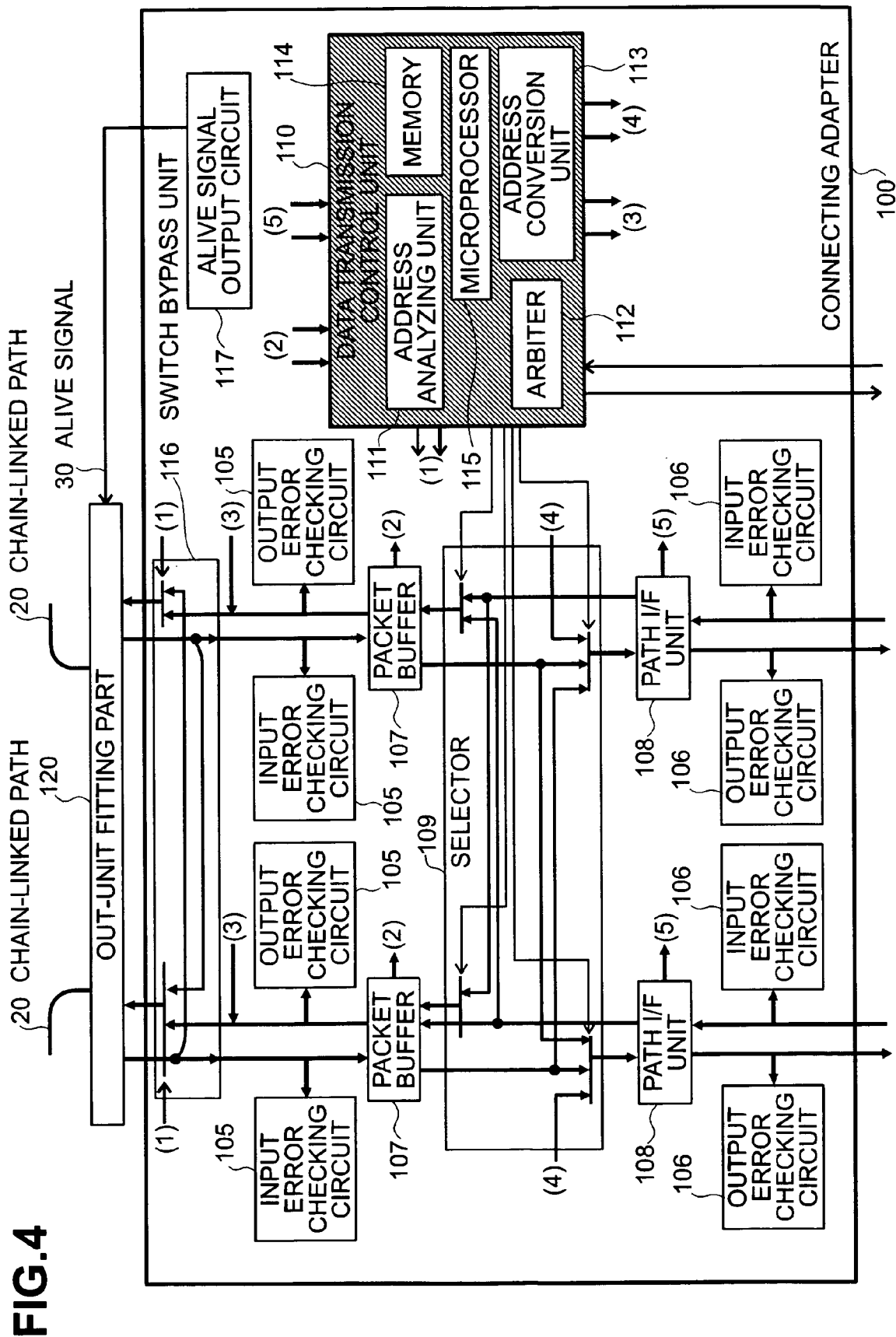
FIG. 4 is a configuration showing an example of a connecting adapter according to the embodiment of the invention.
Figure 5:
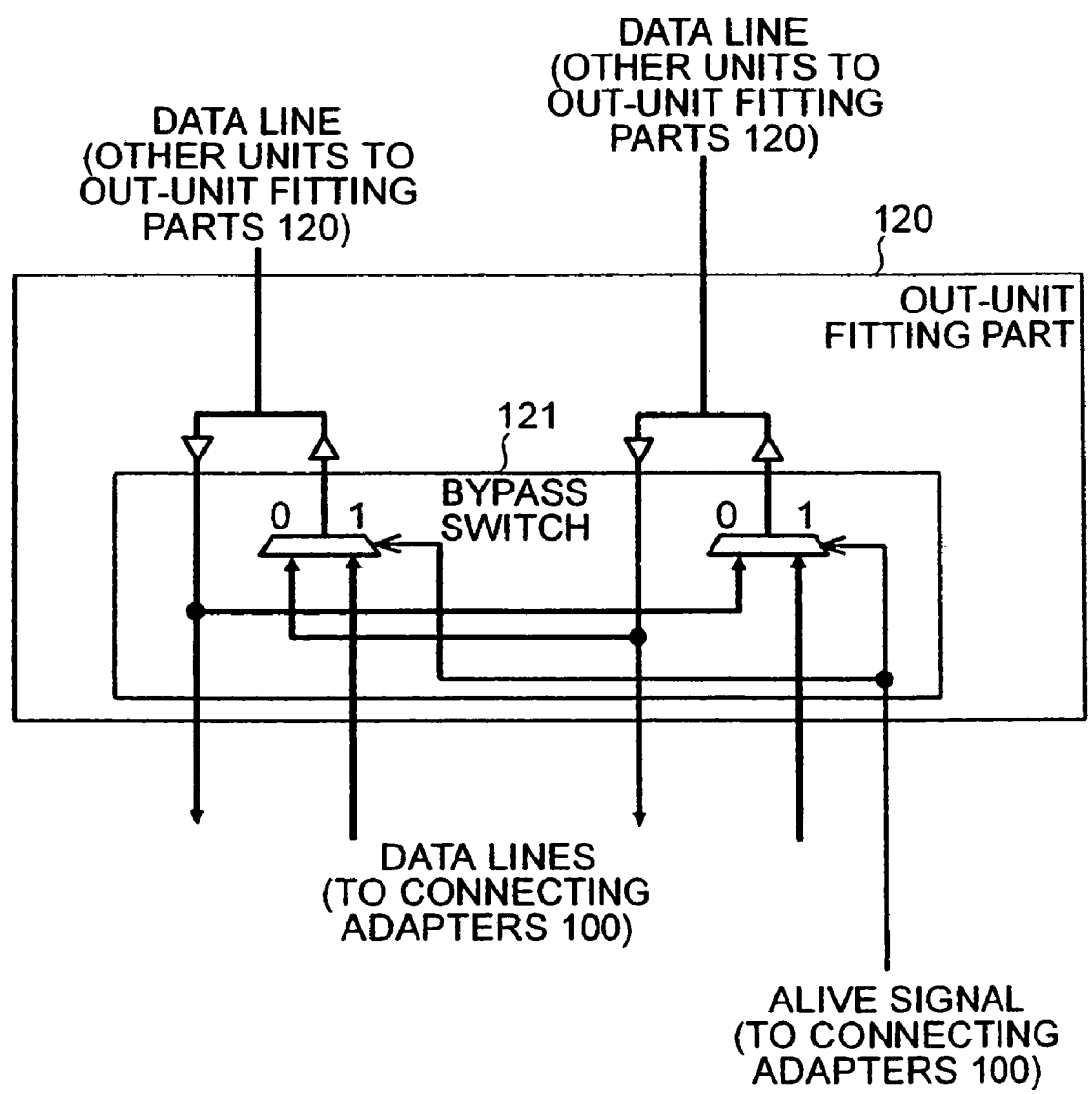
FIG. 5 is a configuration showing an example of an out-unit fitting part in the connecting adapter, according to the embodiment of the invention.

FIG. 3 is a configuration showing an example of the switch unit, FIG. 4 is a configuration showing an example of the connecting adapter 100, and FIG. 5 is a configuration showing an example of the out-unit fitting part 120 in the connecting adapters 100.

In FIG. 3, the switch unit 5 comprises path I/F units 501 connected to paths leading to the host adapters 2, the disk adapters 3, and the connecting adapters 100, path I/F units 501 connected to paths leading to the cache memory units 4, a selector 504 connecting the both path I/F units to each other, packet buffers 503, data-error checking circuits 502, an address/command analyzing unit 506 for analyzing addresses and commands forwarded from the respective adapters such as the host adapters 2, the disk adapters 3, and the connecting adapters 100, and a data transmission control unit 505.

The data transmission control unit 505 is connected to the cache memory units 4 by way of control lines, and has an internal arbiter 507 performing arbitration of demands for access, which are from paths connected to an adapter side and analyzed by the address/command analyzing unit 506, thus carrying out switchover of the selector 504.

The packet buffers 503 buffer a part or all of data being transmitted in order to absorb speed difference in the case where there is a difference in data transmission speed between paths on an adaptor side and paths on a cache memory side.

The address/command analyzing unit 506 comprises buffers for storing addresses and commands, an address sampling unit, and a command sampling unit (not shown), and the address/command analyzing unit 506 stores addresses and commands in buffers, respectively, allotted every adaptor path. The address sampling unit and the command sampling unit deduce a cache path, to which access is to be gained, to forward a switchover demand (request) to the arbiter 507 in the data transmission control unit 505.

In the case where a plurality of adaptors make demands for access to one cache memory, arbitration is carried out for the requests to perform switchover of connection to paths on the adaptor side and paths on the cache memory side.

In addition, such arbitration makes it possible to adjust balance in path connection to the respective adaptors through control of priority.

In FIG. 4, the respective connecting adapters 100 are connected together by means of the chain-linked paths 20. In addition, physical connection affording the chain-linked paths 20 is in some cases by way of cable and in some cases by way of radio. In the case of radio, connection can be carried out by radio conversion of transmission and reception circuits of the connecting adapters 100 being transmitted. In this example, the two chain-linked paths 20 are connected to the connecting adapters 100 via the out-unit fitting parts 120.

Within the out-unit fitting part 120, a bypass switch 121 shown in FIG. 5 bypasses an output to one chain-linked path 20 to the other chain-linked paths 20 when that alive signal 30 from an alive signal output circuit 117, which is output in the case where the disk storage units 10 can operate, is not asserted. The reason for this is that in the case where the disk storage unit or units 10 fail, data should be forwarded to a succeeding repeating installation without disconnection in relay paths even when such disk storage unit or units 10, or the connecting adapters 100 are to be maintained or exchanged.

In addition, by mounting a plurality of connecting adapters 100 and mounting a plurality of bypass switches 121 in the out-unit fitting parts 120, a plurality of chain-linked paths 20 are provided among the disk storage units 10 to afford connection to enable enlarging mounting.

Also, provided are packet buffers 107 connected to paths connected to the out-unit fitting parts 120, path I/F units 108 connected to paths connected to the switch units 5 in the disk storage units 10, a selector 109 connecting the both buffers and units together, input and output error checking circuits 105 for checking errors of data on a side of the chain-linked paths 20, input and output error checking circuits 106 for checking errors of data of paths on a side of switches, and a data transmission control unit 110 being data transmission means.

The data transmission control unit 110 comprises an address analyzing unit 111 being address analyzing means for analyzing addresses and commands transmitted from other disk storage units 10 via the chain-linked paths 20, an arbiter 112, an address conversion unit 113 being address conversion means, a memory 114, and a microprocessor 115.

In addition, the data transmission control unit 110 may be mounted on the same printed board as that for the switch units 5, and the address conversion unit 113 of the data transmission control unit 110 may also be mounted on the switch units 5.

Figure 6:
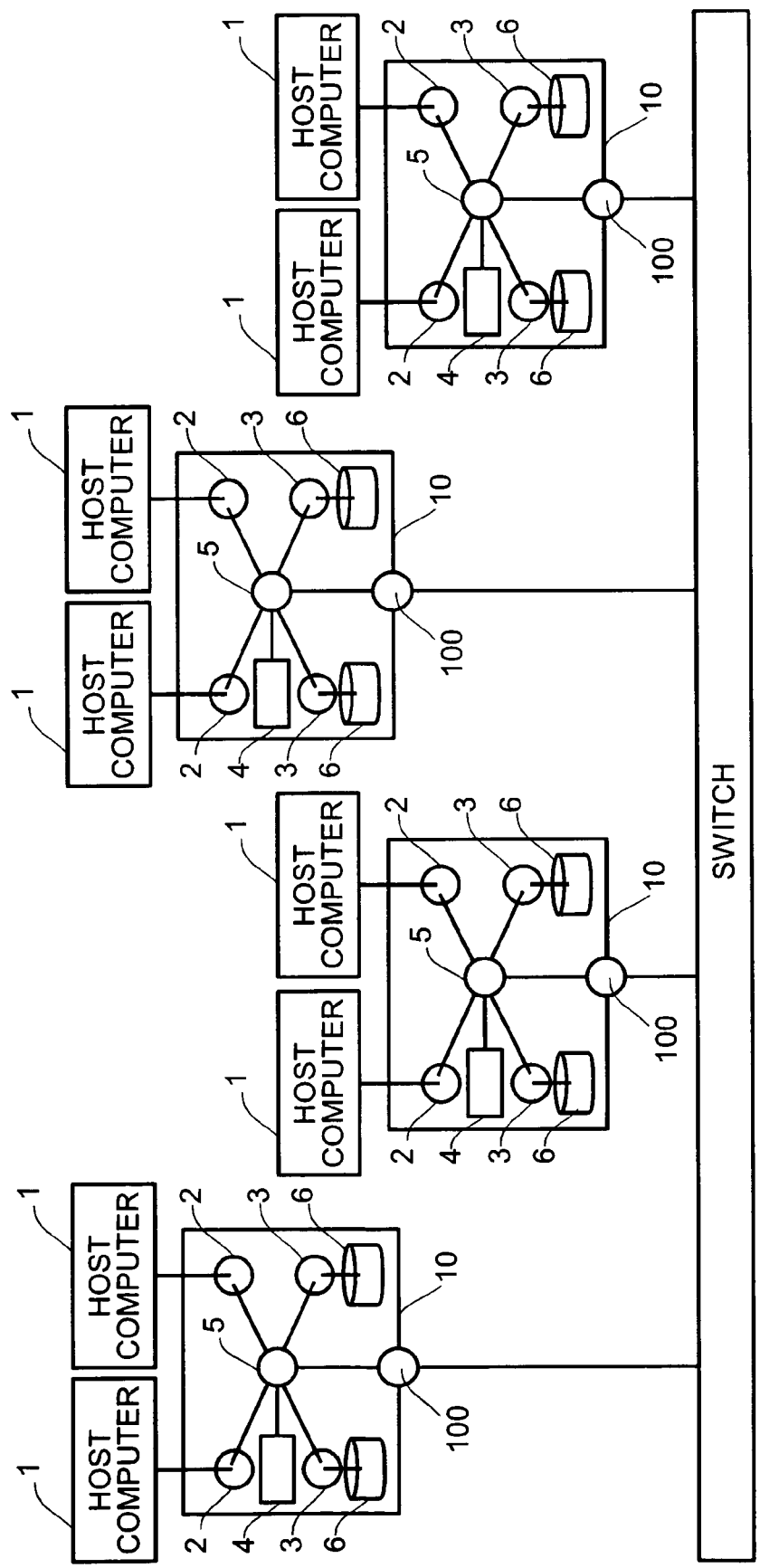
FIG. 6 is a configuration showing another connecting configuration of a disk storage system according to an embodiment of the invention.

In addition, the disk storage system according to the embodiment may comprise not only a configuration of connection shown in FIG. 1 but also a configuration, in which a plurality of disk storage units 10 shown in, for example, FIG. 6 are switched over by way of switches. Such switches are merely a separate configuration of the chain-linked paths 20 to switch over the respective disk storage units 10 to one another.

Figure 7:
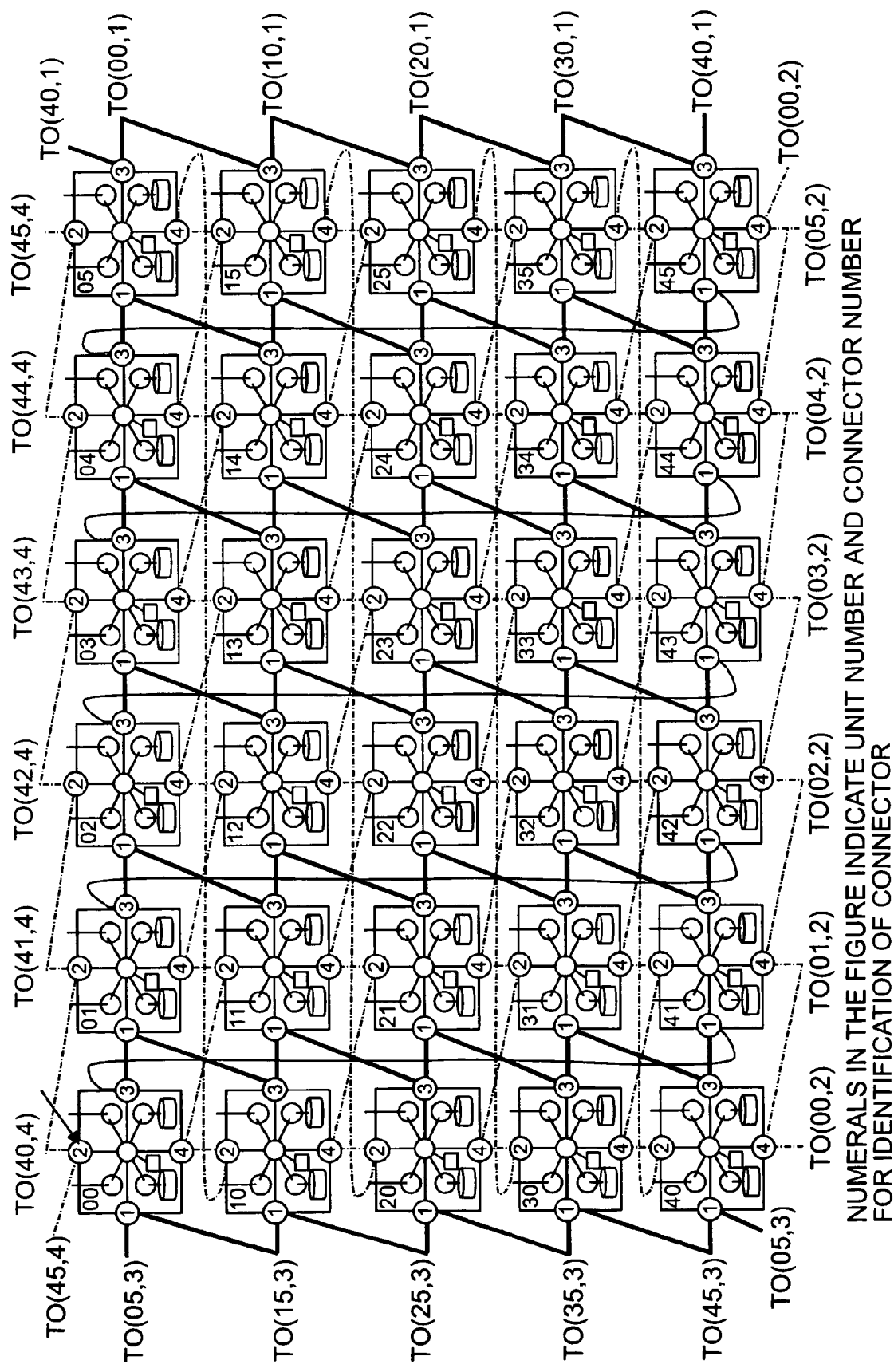
FIG. 7 is a configuration showing a further connecting configuration of a disk storage system according to an embodiment of the invention.

Also, the configuration of connection shown in FIG. 1 may be developed to afford connection of a plurality of disk storage units 10 as shown in FIG. 7. Thus connecting adapters 100 are arranged on four sides of the respective disk storage units 10 and connected together by chain-linked paths 20, and lengthwise and crosswise links are closely connected together like textures to form an aggregate of disk storage units 10.

Subsequently, an outline of an operation of the disk storage system according to the embodiment is described.

Figure 8:
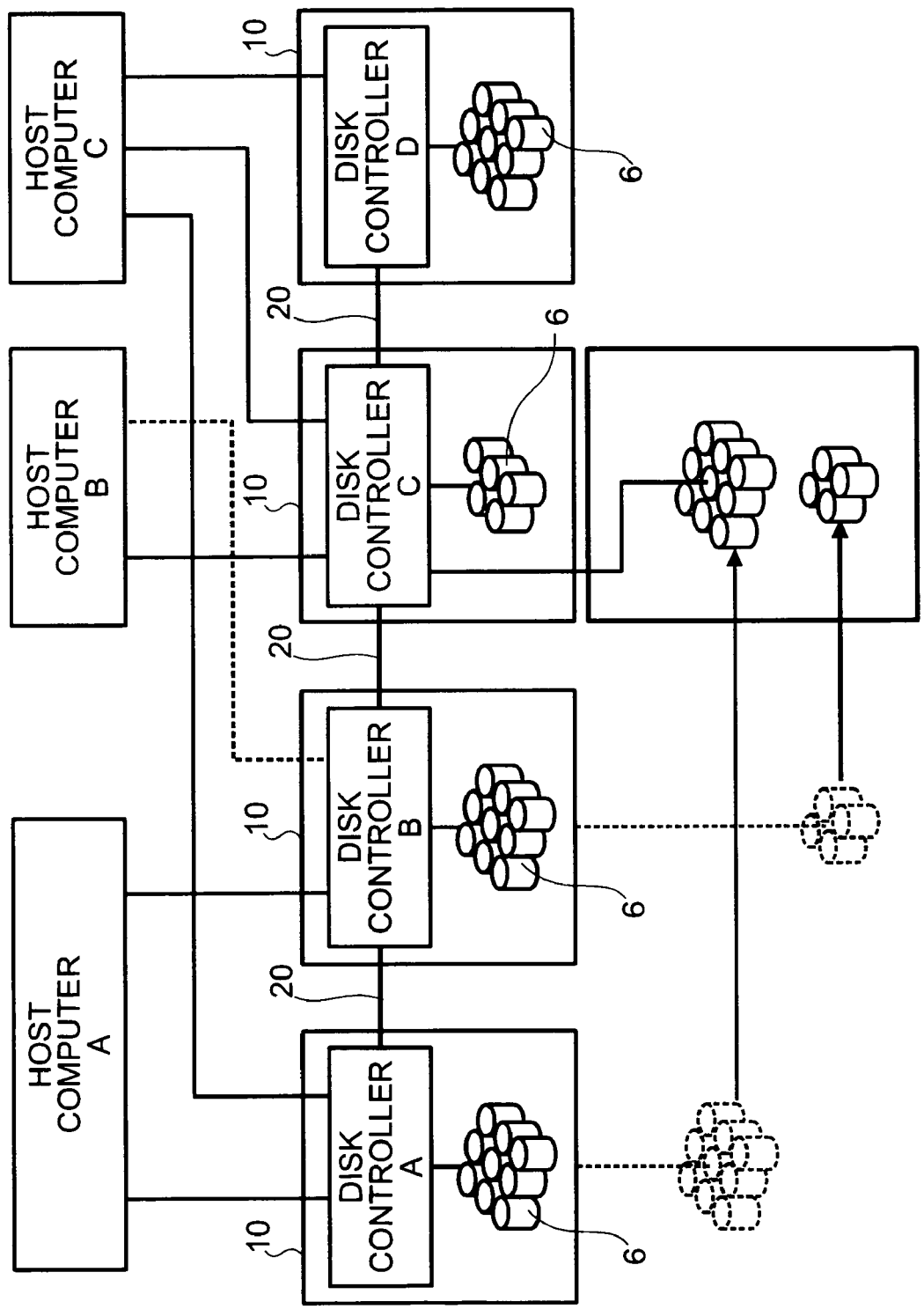
FIG. 8 is an explanation drawing illustrating an outline of an operation of a disk storage system according to an embodiment of the invention.
Figure 9:
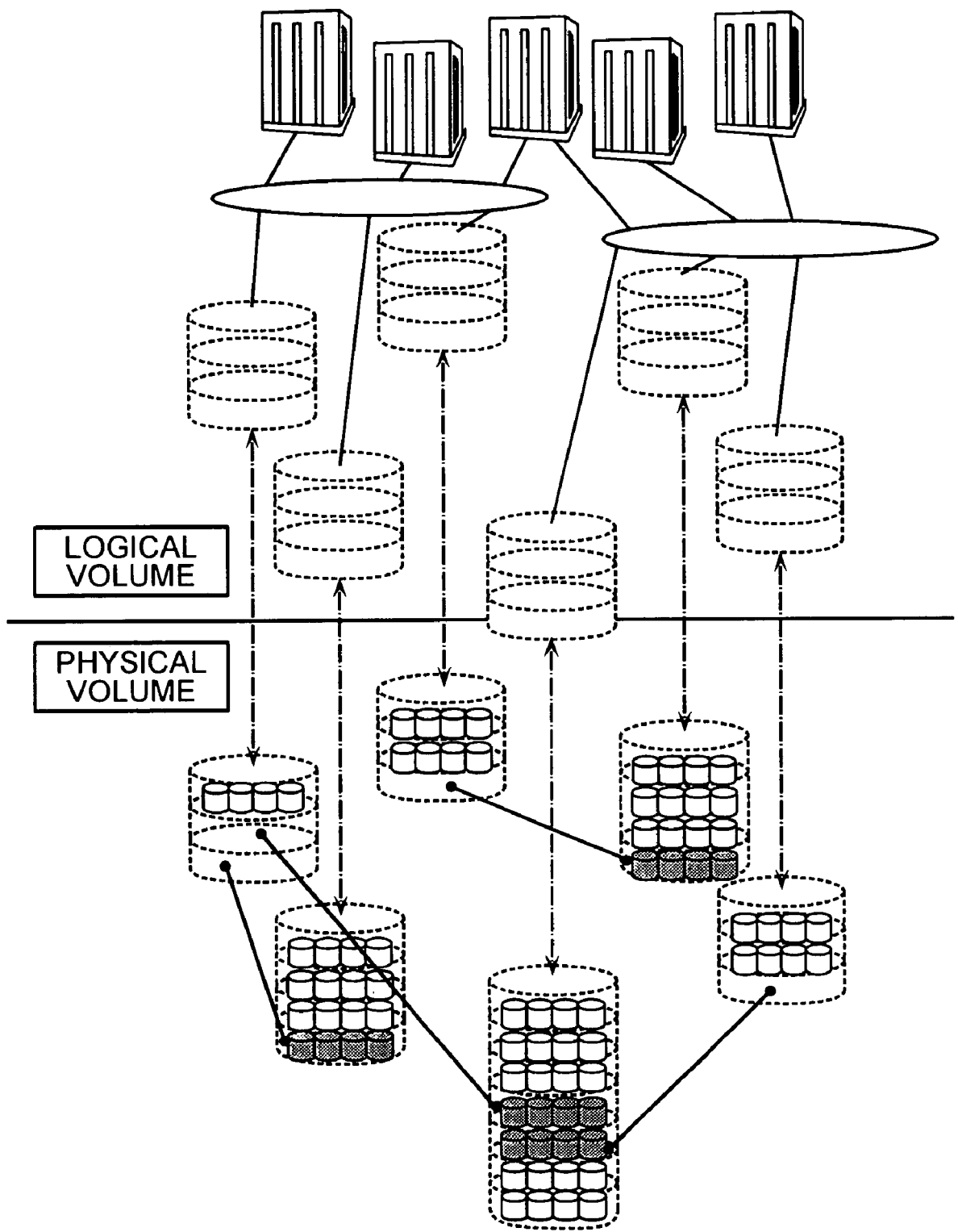
FIG. 9 is an explanation drawing illustrating the relationship between a logical volume recognized by a host and an actual physical volume of magnetic disks, according to an embodiment of the invention.
Figure 11:
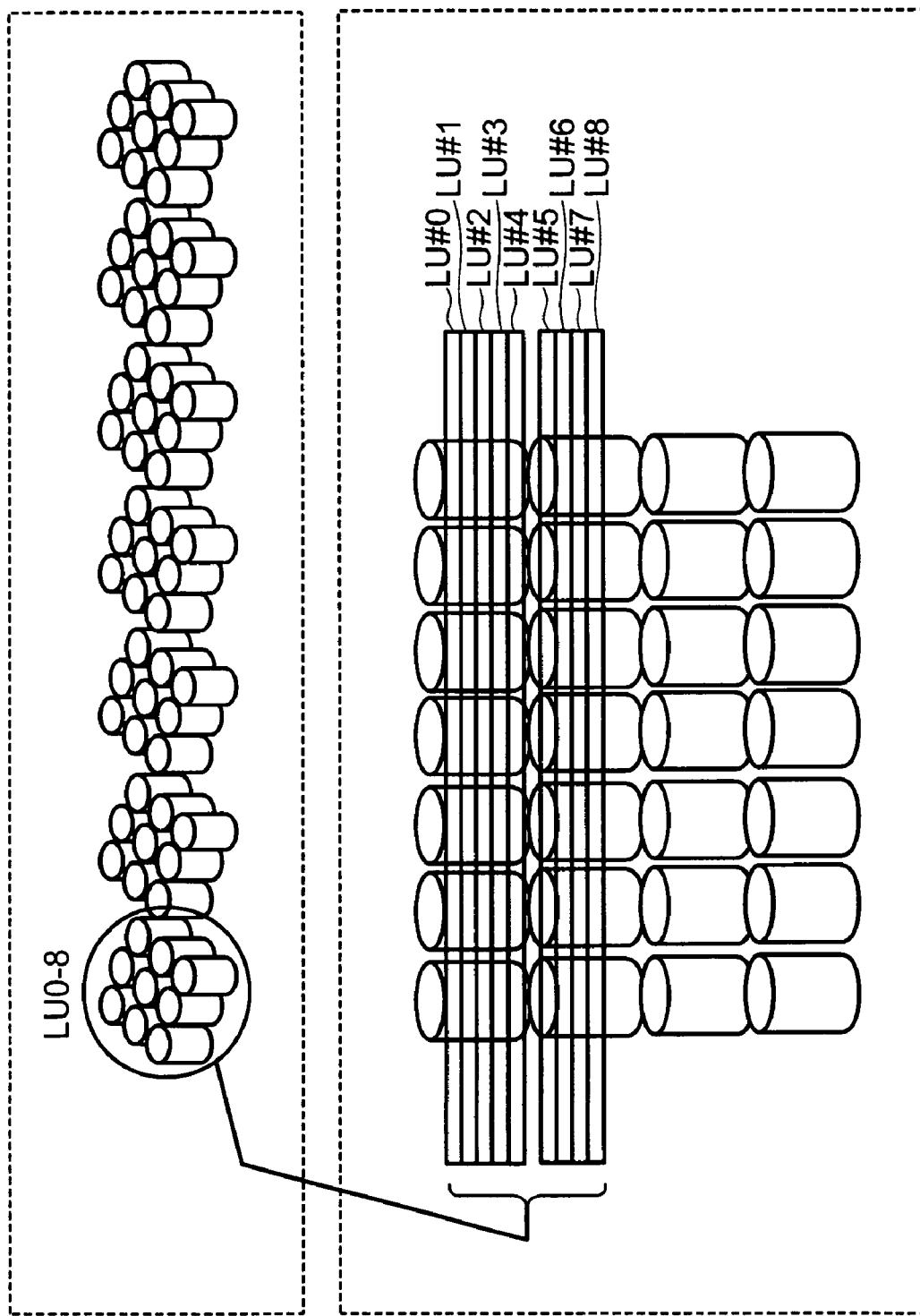
FIG. 11 is an explanation drawing illustrating in-unit logical addresses (LU number) according to an embodiment of the invention.

FIG. 8 is an explanation drawing illustrating an outline of an operation of the disk storage system, FIG. 9 is an explanation drawing illustrating the relationship between a logical volume recognized by a host and an actual physical volume of magnetic disks, FIG. 10 is a view showing a management map for managing who is an owner of a volume within one's own disk storage unit, and FIG. 11 is an explanation drawing illustrating in-unit logical addresses (LU number).

Figure 23:
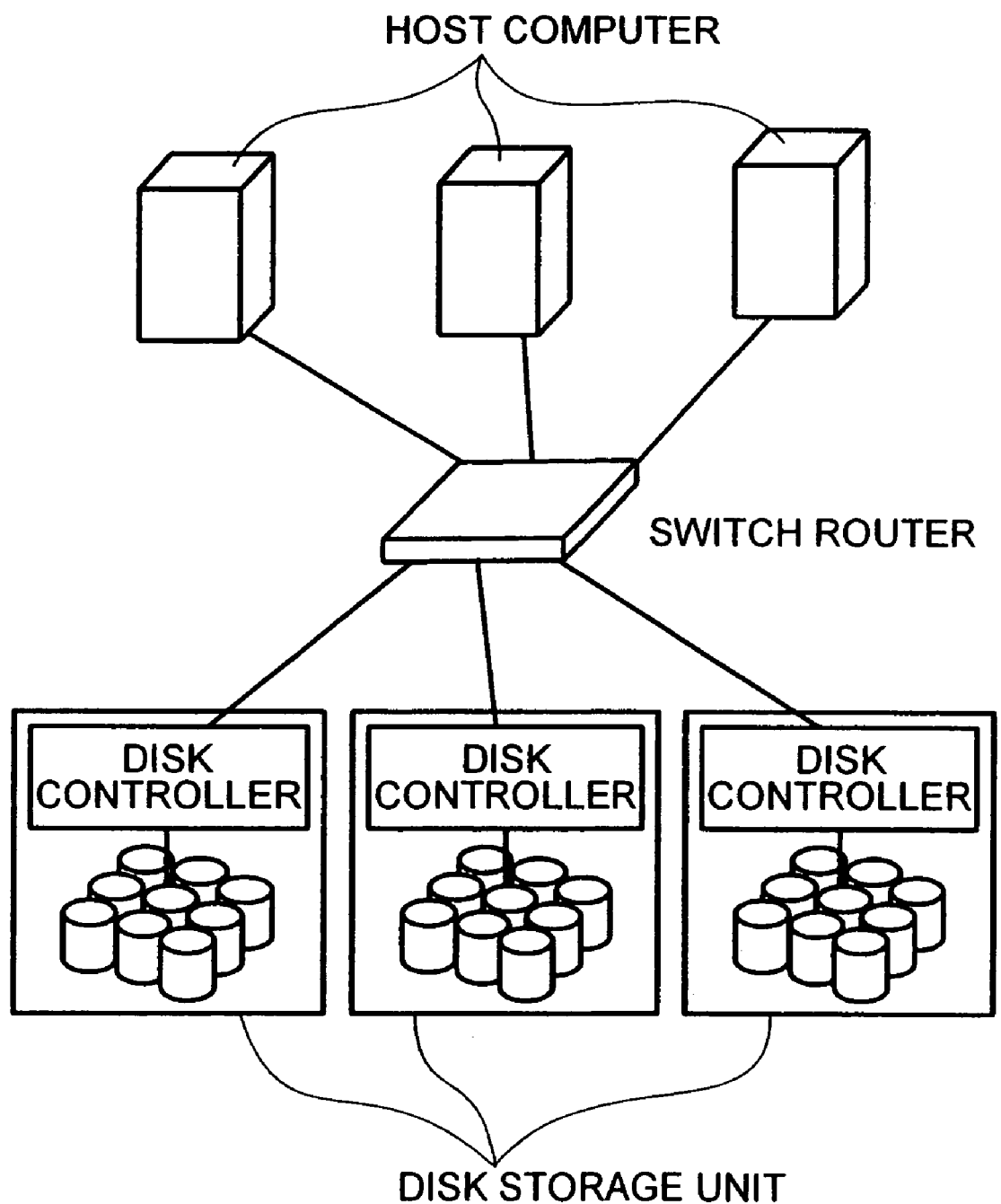
FIG. 23 is a configuration showing a conventional disk storage system.
Figure 24:
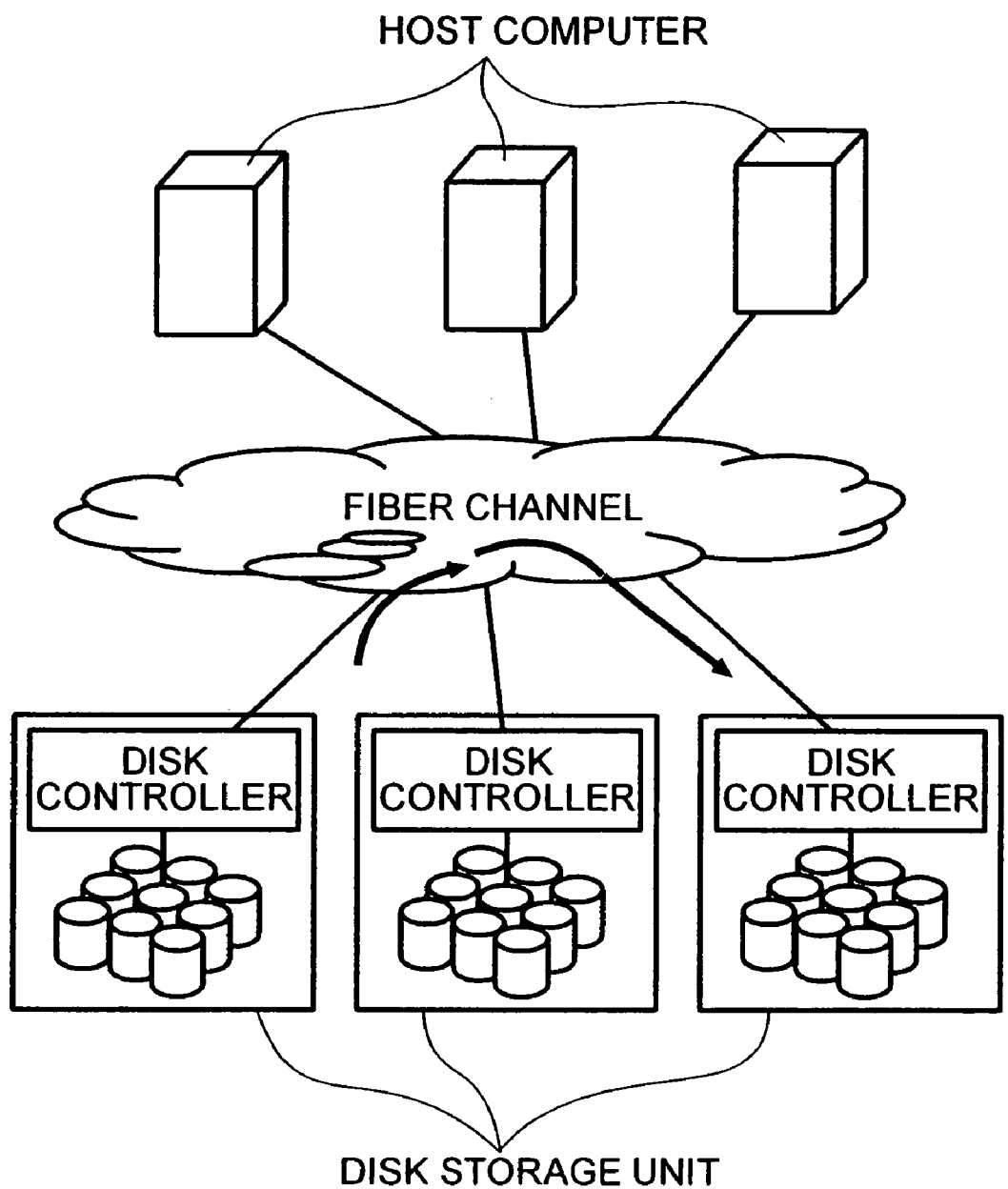
FIG. 24 is a configuration showing a conventional disk storage system.

In a conventional disk storage system shown in FIGS. 23 and 24, the system is downed and much damaged by troubles in router switches for connection and interfaces for connection of hosts and respective devices, and control of the disk storage system is managed on a host side to give rise to the necessity of setting on the host side at the time of extension of devices. In configurations, shown in FIGS. 1, 6 and 7, in the embodiment, operation is possible without making a demand for setting a configuration on the host side.

More specifically, as shown in FIG. 8, a host computer A recognizes groups of magnetic disks indicated by solid lines and dotted lines corresponding to magnetic disks connectable to a disk controller A connected to the host computer but the disk storage units 10 themselves manage to actually cause the groups of magnetic disks to actually gain access to extension disks, placed under the command of a disk controller C, via chain-linked paths 20 connecting disk controllers A, B, C, D, which are composed of respective adapters of the disk storage units 10, together.

In this manner, by assuming a volume of an actual storage device and a logical volume recognized by hosts, it becomes possible to reduce labor required on the host side for setting of switchover at the time of trouble and setting of logical partition due to extension.

Also, as shown in FIG. 9, a logical volume itself managed by the host computers 1 actually contains a virtual volume not less than a capacity of the disk storage units 10 connected to the host computers, so that access corresponding to the capacity can be serviced to the host computers 1 by making the respective disk storage units 10 adaptable without setting on the side of the host computers 1.

At this time, the respective disk storage units 10 must manage who is an owner of a volume within one's own disk storage unit 10.

According to the embodiment, a management map constituting management information as shown in FIG. 10 is retained in the respective disk storage units 10. In the map, data being accessed are mapped by tabling a management source device ID and protect information in logical addresses of one's own unit corresponding to host logical addresses (LU number: logical unit number) specified by the host computers 1, and BLK (for example, 512 bytes) thereof.

As shown in FIG. 11, in-unit logical addresses (LU number) frequently possess physical addresses with a plurality of drives as stripes as in a disk array configuration. In addition, the groups of magnetic disks 6 present in the respective disk storage units 10 shown in FIGS. 1, 2, 6 and 7 are in some cases physically different in configuration according to locations.

Subsequently, details of an operation of the disk storage system according to the embodiment are described.

Figure 12:
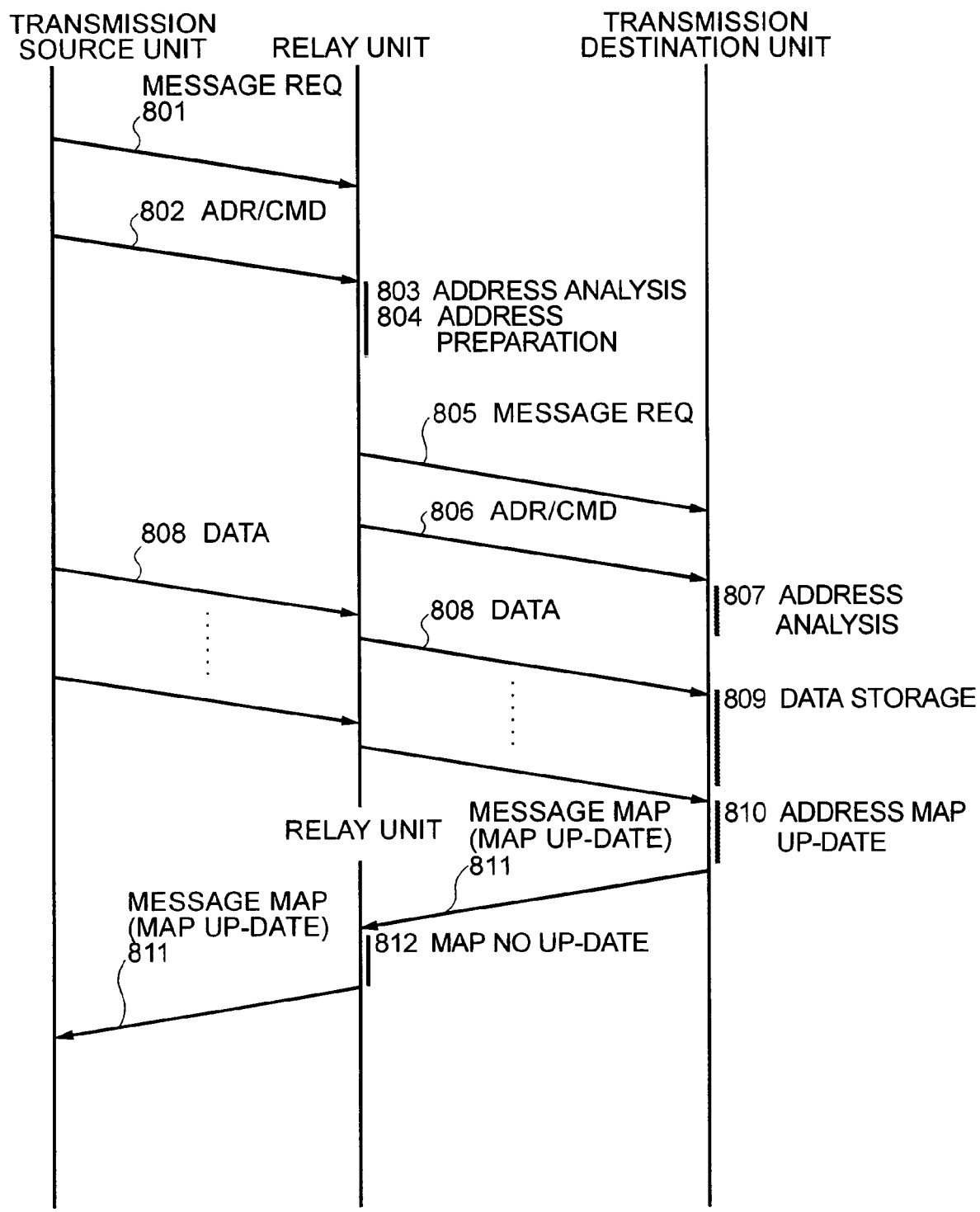
FIG. 12 is a view showing protocol phases between connecting adapters of disk storage units according to an embodiment of the invention.
Figure 13:
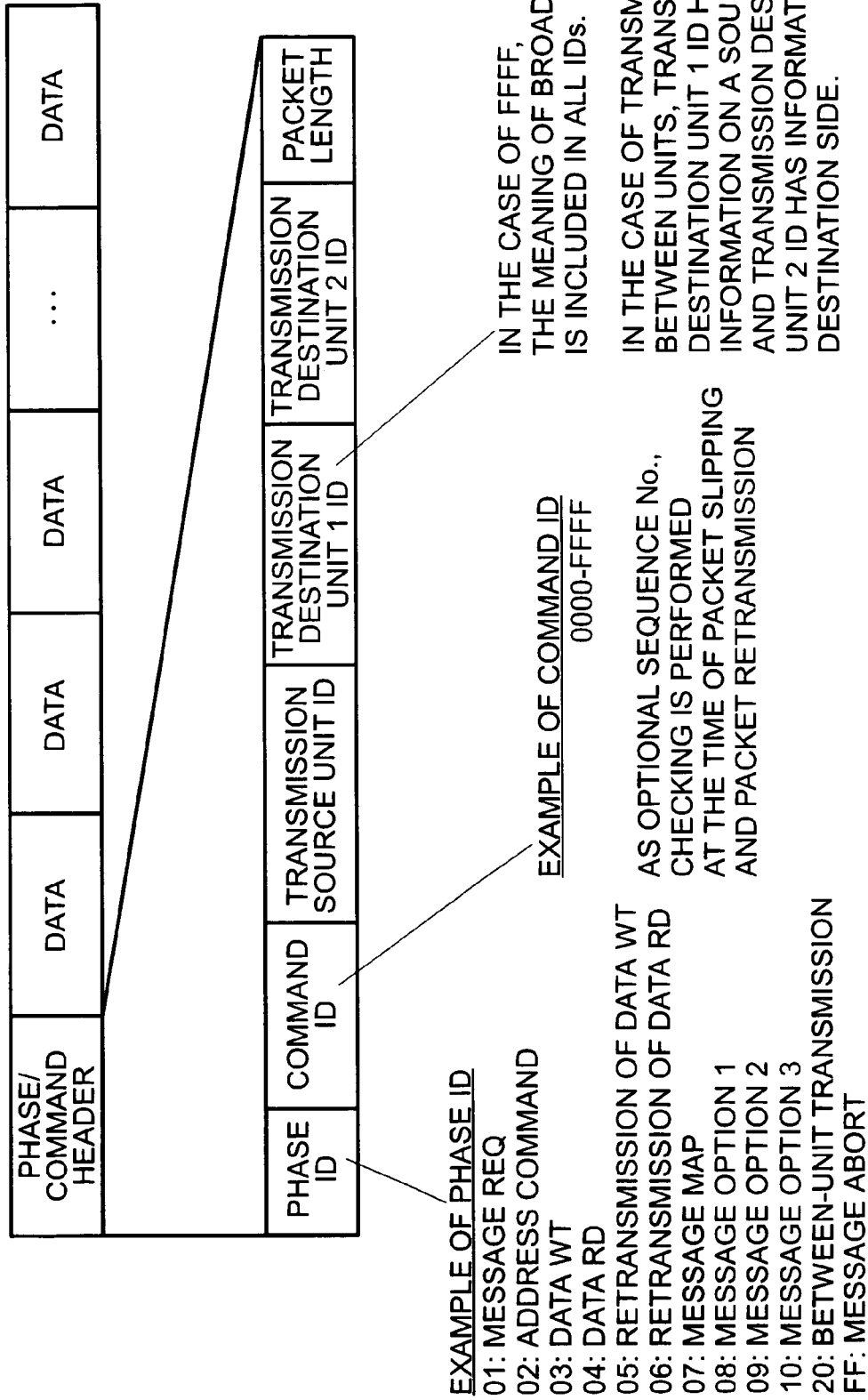
FIG. 13 is a view showing an example of a format of packets on chain-linked paths, according to an embodiment of the invention.
Figure 15:
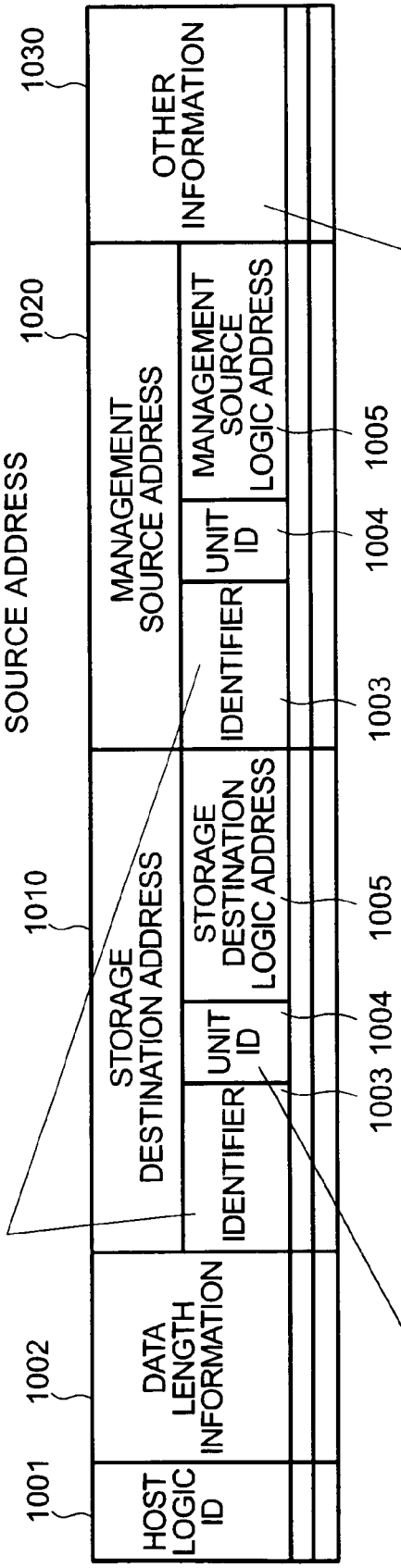
FIG. 15 is a view showing a between-unit address map according to an embodiment of the invention.
Figure 16:
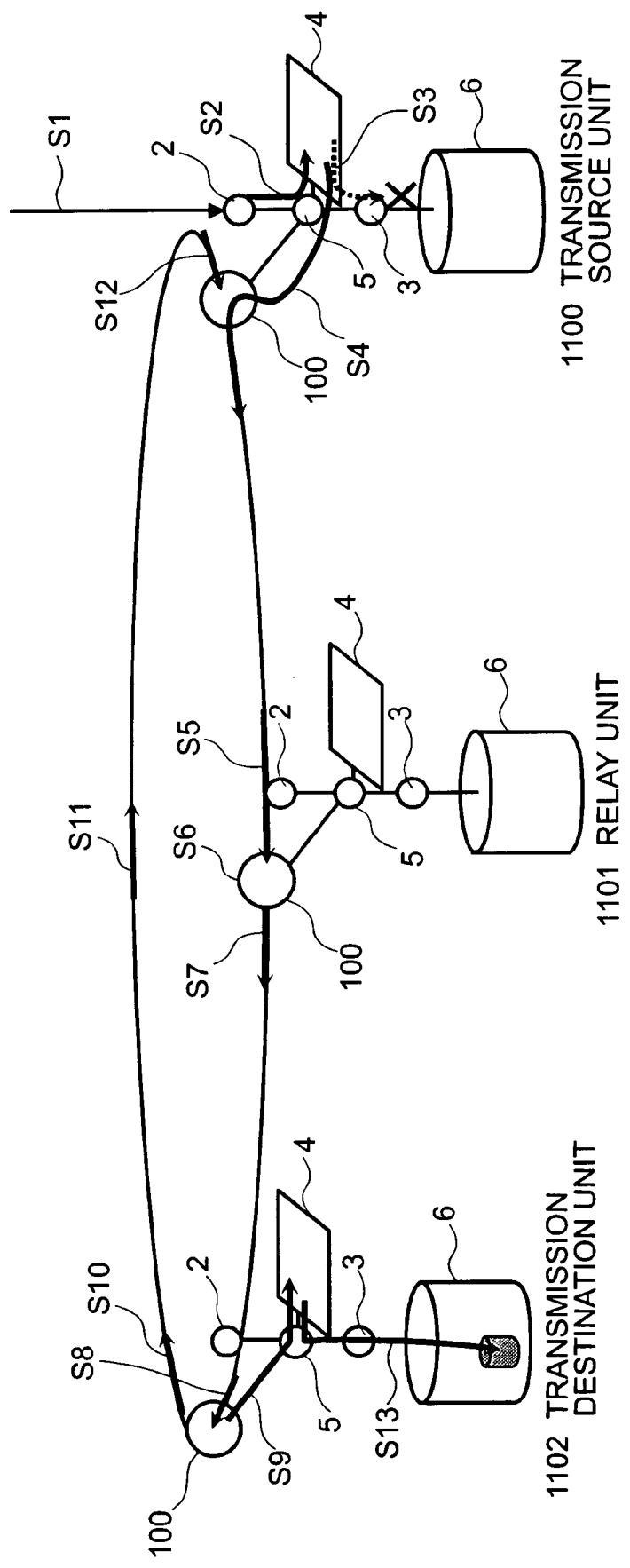
FIG. 16 is an explanation drawing illustrating a subsequently hopping operation in the case where a destination of transmitted data is not one's own, according to an embodiment of the invention.
Figure 17:
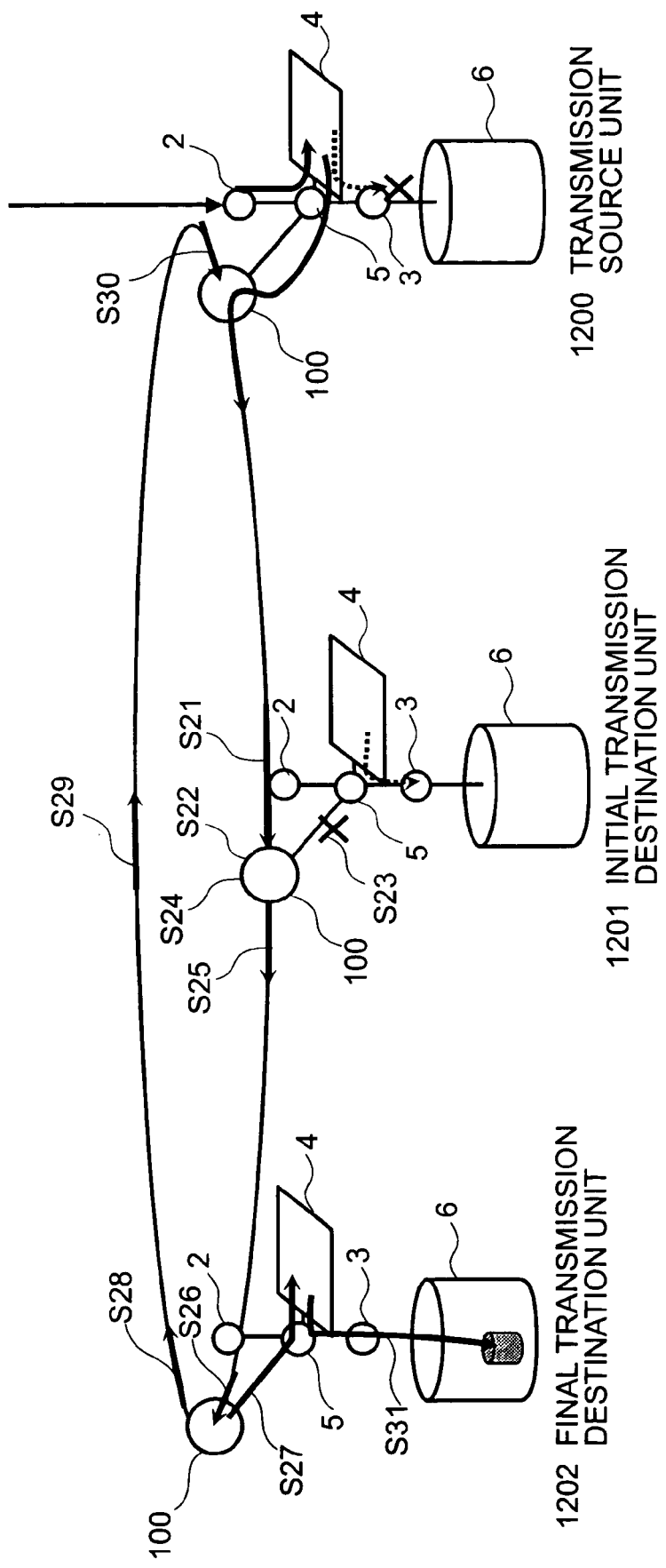
FIG. 17 is an explanation drawing illustrating an operation of converting an address to subsequently relay the same, in the case where disks in one's own unit have no room in an initial transmission destination unit, or in the case where a trouble occurs, according to an embodiment of the invention.
Figure 18:
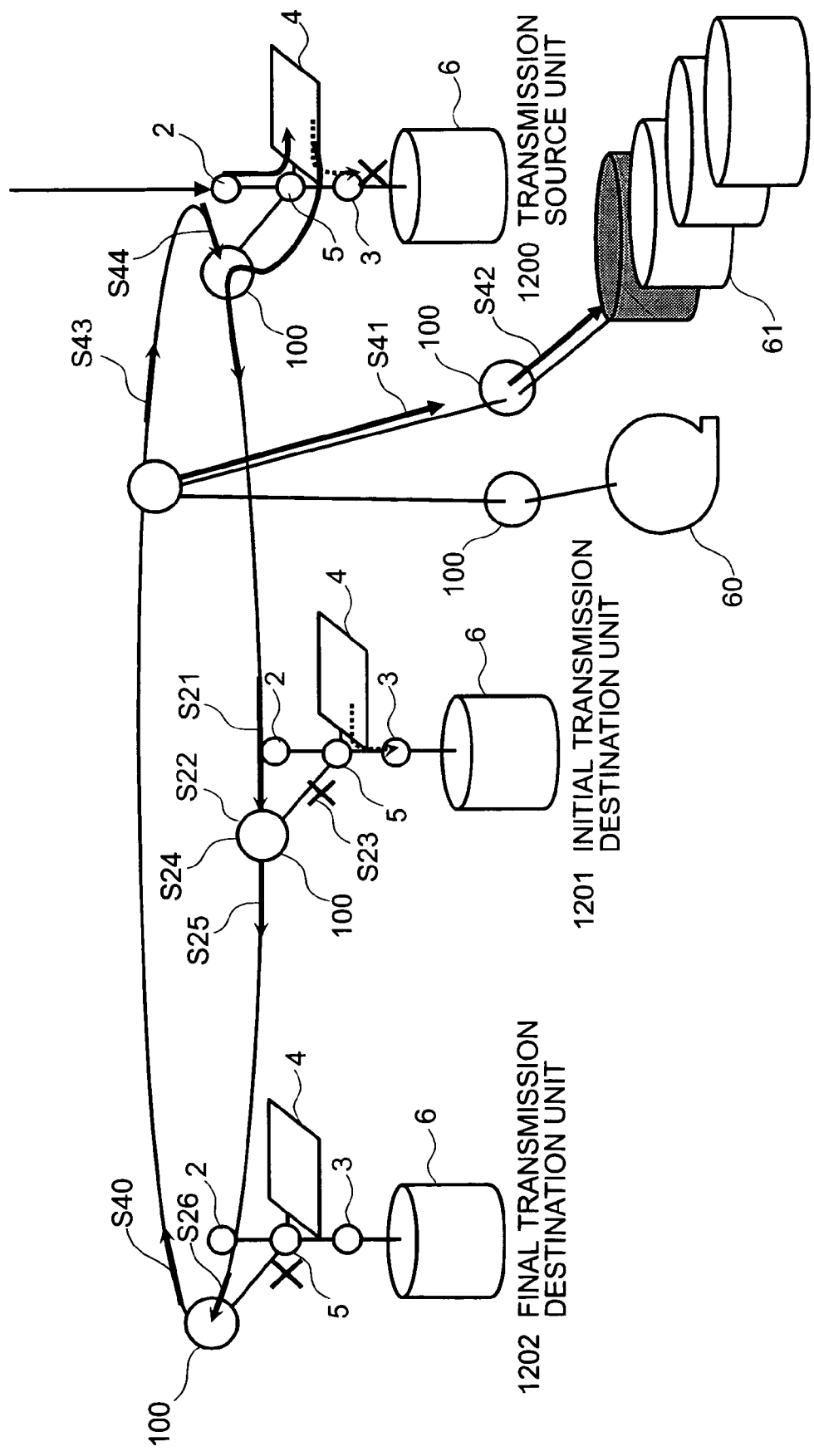
FIG. 18 is an explanation drawing illustrating the case of saving in a save storage, according to an embodiment of the invention.

FIG. 12 is a view showing protocol phases between connecting adapters of disk storage units, FIG. 13 is a view showing an example of a format of packets on chain-linked paths, FIG. 14 is a view showing a between-unit data address format, FIG. 15 is a view showing a between-unit data address map, FIG. 16 is an explanation drawing illustrating a subsequently hopping operation in the case where a destination of transmitted data is not one's own, FIG. 17 is an explanation drawing illustrating an operation of converting an address to subsequently relay the same, in the case where disks of one's own unit have no room in an initial transmission destination unit, or in the case where a trouble occurs, and FIG. 18 is an explanation drawing illustrating the case of saving in a save storage.

Usually, that is, when the groups of magnetic disks 6, in which data requested by the host computers 1 are stored, are mapped on one's own unit, demands for storage from the host computers 1 can be dealt with in one's own unit. In the case where demands for access to data being mapped on other units than one's own unit are made, however, they are forwarded to other units and a unit being an object performs an operation of response.

First, data received from the host computers 1 are kept in the cache memory units 4. Then in the case where it is recognized that there is no disk region for destaging, the connecting adapters 100 transmit data having been temporarily stored the cache memory units 4, outside the unit.

Protocol does not specifically prescribe for transmission between the connecting adapters 100, it suffices to select I/F, and protocol phases shown in FIG. 12 are here shown as an example. They comprise address/command phases, data phases, message (REQ, MAP_UPDATE) phases.

A disk storage unit 10 becoming a relay unit delivers data in order every phase between a disk storage unit 10 being a transmission source and a disk storage unit 10 being a transmission destination. At this time, address commands and data are transmitted between a REQ message for the start of transmission and a STATUS message for the termination of transmission. In the example shown in FIG. 12, data are directed at the time of writing while data 808 are directed oppositely at the time of reading.

Also, the connecting adapters 100 constantly perform polling as to in which phase data correspond to a data packet as received and which are a transmission source and a transmission destination. Therefore, unit address information and phase/command information are represented on a header for format of a data packet to monitor protocol. FIG. 13 shows an example of format of a packet on the chain-linked paths 20.

At this time, a transmission destination address makes an address in a unit connected by way of the chain-linked paths 20. In order to relay data from a connecting adapter 100, the data transmission control unit 110 of the connecting adapter 100 must recognize an address of a responsibility source of data, that is, a transmission source unit, and an address of a unit being a destination of storage. Format of such addresses structures identification IDs of data, a transmission destination address being a transmission destination, and a transmission source address being a transmission source, from the host computers 1 like an example of a between-unit data address format 1111 shown in FIG. 14, and the data transmission control unit 110 analyzes them.

A transmission source unit address includes a unit ID, by which the unit is specified in the chain-linked paths 20, and an in-unit logical address managed in the unit while a unit address of a transmission destination unit includes a unit ID and an in-unit logical address. Unit IDs are determined to be peculiar to respective units connected by way of the chain-linked paths 20.

Also, the address analyzing unit 111 checks an address of a transmission source unit, and an address of a transmission destination unit, that is, extracts unit IDs to first determine on the basis of the unit IDs whether a transmission destination address input through a signal (2) shown in FIG. 4 corresponds to (A) an address for other unit and (B) an address for one's own unit.

Here, an explanation is given to operations in the cases (A) and (B) determined by the address analyzing unit 111.

First, in the case of (A), data are hopped and relayed to a disk storage unit 10 connected by way of a separate chain-linked path from that of a transmission source. That is, a relay unit 1101 shown in FIG. 16 operates.

First, a host makes a demand for writing of data, on a transmission source unit 1100 being a responsibility source (STEP 1). Then data are once buffered from a host adapter 2 of the transmission source unit 1100 to the cache memory unit 4 (STEP 2).

And since destaging to disks is not possible (STEP 3), the connecting adapters 100 transmit the data to a transmission destination unit 1102 as a demand for writing outside the unit (STEP 4). Hereupon, the relay unit 1101 positioned midway between the transmission source unit 1100 and the chain-linked paths 20 of the transmission destination unit 1102 temporarily receives data from the transmission source unit 1100.

Then the relay unit 1101 analyzes that a transmission destination unit ID present in a header of protocol packet shown in FIG. 13 is not one of one's own and determines that the data should be relayed to an adjacent unit. More specifically, the relay unit 1101 receives the data (STEP 5), analyzes an address (STEP 6), and performs data transmission (STEP 7).

Then the transmission destination unit 1102 receives the data (STEP 8), determines that the data can be stored in one's own unit and once stores the data in the cache memory unit 4 (STEP 9), and allocates an in-unit logical address to transmit map updated information to the transmission source unit 1100 (STEP 10).

Thereafter, a physical address of a disk in the unit is allotted to the data, and the cache memory unit 4 performs destaging of the data to the disk (STEP 13). The map updated information reaches the transmission source unit 1100 (STEP 12) by way of hopping of the respective relay units (STEP 11), and an address map of the transmission source is correctly updated on the transmission destination unit 1102. In addition, an address is not renamed in relay in the case of reading.

In addition, in a concrete operation inside in STEP 6, the data transmission control unit 110 in FIG. 4 transmits an address between two packet buffers 107 via the selector 109 to transmit (hopping) the same to a separate unit via the out-unit fitting part 120.

Then an operation for switching a select signal ((1) in FIG. 4) in the switch bypass unit 116 and bypassing a subsequent data record for relaying to a subsequent unit is performed.

Also, in the case of (B), that is, in the case where a unit ID of an address transmission destination is in agreement with one's own unit ID, a between-unit data address map 1000 shown in FIG. 15 and stored in the memory 114 with a transmission source address as key is searched for confirmation of whether a pertinent data address is registered therein.

The between-unit data address map 1000 causes storage destination addresses 1010 in borrowed units and management source addresses 1020 managed by original data to be referred to with an actual host logical ID as key. That is, when a unit ID 1004 of the management source address 1020 is one's own unit ID, it corresponds to an address map of that data in another unit, which one unit rents, and in another case, that is, when a unit ID of the storage destination address 1010 is one's own unit ID, it is recognized that concerned information is address map information of that data in one's own unit, which is rented.

In the case where a command is for writing, a host logic ID 1001 is searched for in the between-unit data address map 1000, and when an in-unit logical address of the storage destination address is not registered, it is newly allotted.

Also, in the case where a command is for reading, an in-unit logical address obtained by searching the between-unit data address map 1000 is converted into a physical address in a logical/physical address conversion table in another unit, and data are taken out of physical addresses in a cache memory in the case of being present in the cache memory unit 4, and out of physical addresses on magnetic disks via the disk adapters 3 in the case of being not present in the cache memory unit 4, and transmitted to a unit having a demand source, that is, an original management source address of the data.

In addition, a unit of logical addresses may be managed by a logical volume, or may be a block unit and a region unit of a plurality of blocks. However, with a block unit, a management table becomes large, and with a logical volume, enormous data will be accessed outside a unit.

In examples shown in FIGS. 10 and 11, logical addresses comprise LU number and a block address, and are converted into physical addresses through logical-physical conversion, to which a RAID configuration is added, to be stored.

Subsequently, an explanation is given to the case where a data destination is one's own unit and one receives data oneself.

First, it is confirmed that a disk storage region capable of receiving data is present, and an in-unit logical address is newly allotted. In addition, the in-unit logical address is finally converted into an in-unit logical address for the groups of magnetic disks 6 by the disk adapters 3 to be subjected to mapping.

Concretely, a method of possessing a mapping table and a method of positioning with computational algorithm are conceivable, that is, an in-unit physical address for the groups of magnetic disks 6 is subjected to mapping in response to allocation of the in-unit logical address.

According to the above procedure, an address is subjected to mapping, and then transmitted to the cache memory unit 4. A transmission address to the cache memory unit 4 is converted into an in-unit logical address. Such conversion is effected by the address conversion unit 113 in the data transmission control unit 110 such that a logical address is converted into a physical address on a cache memory to be output to (4) shown in FIG. 4.

The switch unit 5 switches connection to the cache memory unit 4, of which an internal data path is indicated for the connecting adapter 100 by its in-unit physical address. Subsequently, the connecting adapter 100 receives a packet of data phase to temporarily store the same in the cache memory unit 4.

Then the disk adapters 3 performs destaging to the in-unit physical address from the cache memory unit 4, and thus data are stored in the groups of magnetic disks 6.

Also, at that stage, at which data are temporarily stored in the cache memory unit 4, the connecting adapter 100 transmits a message phase of map updating to a subsequent unit with a destination unit ID in header information in the packet as a transmission source unit ID. In this case, other parts, that is, data other than the header in the packet have address map information added thereto to be transmitted. Also, in the case of NG, a phase ID becomes FF:message abort to transmit fault information as data.

These messages are relayed through the chain-linked paths 20 of respective units, and a transmission destination unit receives them to update an address map in its own memory. Address map information are not updated in units for relay. Only hopping is performed in the case where the messages are not related to one's own unit.

Subsequently, an operation in the case where the groups of magnetic disks 6 in one's own unit have no storage area is described.

In the case where the groups of magnetic disks 6 in one's own unit have no storage area, a course is adopted, in which data are transmitted to other units since they cannot be stored in one's own unit and a transmission source is informed thereof.

Therefore, it suffices that address information in a packet of an address phase received at this time be relayed to an adjacent unit, and it is necessary to swap a unit address of a transmission destination in the information to an adjacent unit, or an optional unit.

A course of preferentially swapping an optional unit suffices to cause a microprogram of the microprocessor 115 shown in FIG. 4 to instruct the address conversion unit 113 on swapping to a fixed address, and in the case where other instructions than this are not given, an adjacent unit ID may be adopted.

The data transmission control unit 110 shown in FIG. 4 causes the address conversion unit 113 therein to complete swapping of an address to an adjacent address.

First, as shown in FIG. 17, an initial transmission destination unit 1201 receives a demand for data and data from a transmission source unit 1200 (STEP 21), but it is found that data cannot be stored (STEP 22, STEP 23), and an address is transmitted (STEP 25) to a separate transmission destination unit by swapping (STEP 24).

Then a final transmission destination unit 1202 receives data through a relay unit (see FIG. 16 for an operation of the relay unit) (STEP 26), and judging that the data can be stored in one's own unit, temporarily stores the data in the cache memory unit 4 (STEP 27), and allocates an in-unit logical address to transmit map update information to the transmission source unit 1200 (STEP 28).

Thereafter, a physical address of a disk in the unit is allocated, and destaging is performed from the cache memory unit 4 to the groups of magnetic disks 6 (STEP 31). The map updated information reaches the transmission source unit 1200 through hopping in the respective relay units 1101 (STEP 29), and an address map of the transmission destination is exactly updated in the final transmission destination unit (STEP 30). In addition, no swapping of an address is performed in relay in the case of reading.

Accordingly, hopping relay as shown in FIG. 16 is carried out such that data are exchanged between the transmission source unit 1100 and the transmission destination unit 1102 for a demand via a plurality of relay units 1101. In addition, a concrete method of determining an optional unit address is described later.

Subsequently, an operation in the case where data are not input into other units is described.

First, when NG is reported in the case where data are not input into other units, data are returned to a transmission source following a loop in the case where reception is not carried out as a result of going via the relay units 1101 in a multiple manner. Alternatively, a NG message in place of data must be forwarded by an adjacent unit on a separate side on a ring from that side of an adjacent unit, to which a transmission source unit initially transmits, that is, a relay unit one on this side of the transmission source.

As a result of this, a relay destination NG is known depending upon whether data are replied with one's own unit as a destination, or a NG message is transmitted in place of STEP 30 shown in FIG. 17.

In this case, since data are not stored in a disk, it is not possible in terms of data guarantee to accept further requests from the host computers 1, and it is not possible for the system to bear insufficiency in capacity.

Also, when data are to be saved in a keeping storage in the case where data are not input into other units, assuming an occasion when it becomes impossible for the system to bear insufficiency in capacity, a tape storage 60 for backup and a disk storage 61 having a performance inferior to common disks but being inexpensive and large in capacity are prepared as shown in FIG. 18, the final transmission destination unit 1202 one on this side of the transmission source does not return an error to the transmission source unit 1200, and an address is swapped on the tape storage 60 for backup and the disk storage 61 to be transmitted (STEP 40).

Then the tape storage 60 for backup and the disk storage 61 receive this (STEP 41) to store data (STEP 42). Then report of reception from the tape storage 60 for backup and the disk storage 61 is received via the connector adapters 100 to be transmitted to the transmission destination unit (STEP 43).

Then the data reach the transmission source unit 1200, and an address map of the transmission source is exactly updated on the tape storage 60 for backup and the disk storage 61 (STEP 44).

At this time, storage in the tape storage and the inexpensive disk storage makes it possible to distinguish information by kind as shown in an example of unit ID 1004 in FIG. 15 to forward the information to the transmission source.

Also, an operation is conceivable, in which a number of disk housings for keeping, to which any host is not connected, and which have no host adapter function, are beforehand connected in a loop to beforehand prepare a standby keeping storage affording common use in the loop. And at the time of subsequent reading, a period of time required for relay between respective disk controllers (DKC) can be reduced by selecting the keeping storage, and data being frequently accessed are subjected next time to processing in the transmission source unit for swapping with other data. At this time, a between-unit copying function may be used, which is explained later.

Also, when data are not input into other units and transmitted to a separate loop, a single unit has a plurality of connecting adapters and a loop connected to the connecting adapters in, for example, a connecting configuration shown in FIG. 7, whereby a transmission destination unit can be transmitted through a connecting adapter 100 connected to a separate loop.

Here, a connecting adapter 100 shown by an example (00, 2) in FIG. 7 is indicated in a location of a connector No. 2 by a unit No.='00'. When transmission from a unit 00 to a unit '11' is desired, relay in connecting adapters 100 is made possible via (00, 3)-(01, 1)-(01, 4)-(11, 2) and the switch unit 5 in a unit '01'. Also, data may be transmitted via a unit '10' as a separate route, at which data are transmitted via (00, 4)-(10, 2)-(10, 3)-(11, 1).

Subsequently, a method of determining a unit in the case of swapping of an address for an optional unit is described.

First, several examples of a course, in which an address is preferentially swapped on an optional unit, are illustrated as a method of determining a specified unit ID.

One of them is to select other unit IDs present in an address map. This is selected in view of actual results, and the surest in the case where information such as failure or the like is not known in advance.

Further, in the case where the giving relationship with a specified unit is produced, it is expected that data undergoing staging on a cache is enhanced in efficiency and a performance exhibits itself at the time of reading.

A further one of them is to select other unit IDs not present in an address map and having no actual results on the other hand. This resides in distribution on the other hand entertaining misgivings in the first method about insufficiency in capacity of a certain unit as a result of concentrated dependency on the unit. Such distributed arrangement makes it possible to select shift units having a larger capacity. This course has a defect in that when data bridged over a plurality of units by distribution are accessed for reading, overhead is imposed to stage respective data on respective units. The distributed arrangement makes it possible to select shift units having a larger capacity.

A still further one of them is an option of beforehand fabricating a list of a specified group ID and performing distribution in accordance with the list. In order to select a specified group, it is conceivable to collect residual capacities of respective units and parameter values representative of loaded states to list them.

For inquiries of loaded states and residual capacities, when an operation, in which a message option 1 and a transmission destination ID of the phase ID in FIG. 13 are made "FFFF" to perform broadcast transmission, is defined as a loaded state call, respective units declares their ID+loaded state exponent in data part and connect them in order to return them to a transmission destination when the respective units relay messages, and a transmission source has the microprocessor 115 analyzing and listing them to keep the list in a memory of a processor.

For inquiries of residual capacities, a message option 2 and a transmission destination ID "FFFF" are combined to define a residual capacity call, and information is procured to be listed.

The respective units manage disk being not defined or logical devices being not used, except preset logical devices to inform usable capacities thereof.

There is conceivable a method of sorting the list with respect to residual capacities and loaded states, selecting the best four data having large evaluation indices by residual capacities to group, selecting a destination, which data are to hop, or selecting the best four data in the order of decreasing magnitude of indices of loaded states to group them, and selecting data among them.

Also, a method of determining a transmission destination by constraints based on location and loop information is on the assumption of possession in advance of all information of connectable units in retrieval by the list of the specified unit described above (or possession of information of units in a specified group).

While being relatively easily thought of in a single loop shown in FIG. 1, a plurality of connecting adapters 100 and a plurality of chain-linked paths 20 are supposed as an actual unit configuration.

FIG. 7 exemplarily shows an arrangement, in which four loops composed of the connecting adapters 100 and the chain-linked paths are connected to four sides of respective units. While it is desired that all the units have all information of the group of units, an enormous amount of information results and so extension conformed to enlargement of a whole configuration is not realistic.

Therefore, a method is adopted, in which respective units manage information of the group of units, which give and receive data between the units, an efficient target (transmission destination) is selected, selection is entrusted every time every relay unit, and the transmission destination is finally reported.

The relay units adopts a method of managing information of loops connected to a connecting adapter 100 thereof, selecting adapters of other units close thereto, and selecting a relay destination by a list of conditions for restriction on access.

In this case, a unit list of those conditions for restriction on access, which are determined by parameters such as fault information, space capacity information, access permission information, and so on, may be based, and such information is input through message communication between units in concert with information.

Subsequently, a concrete example of an operation, in which a transmission destination is determined, is described.

Figure 19:
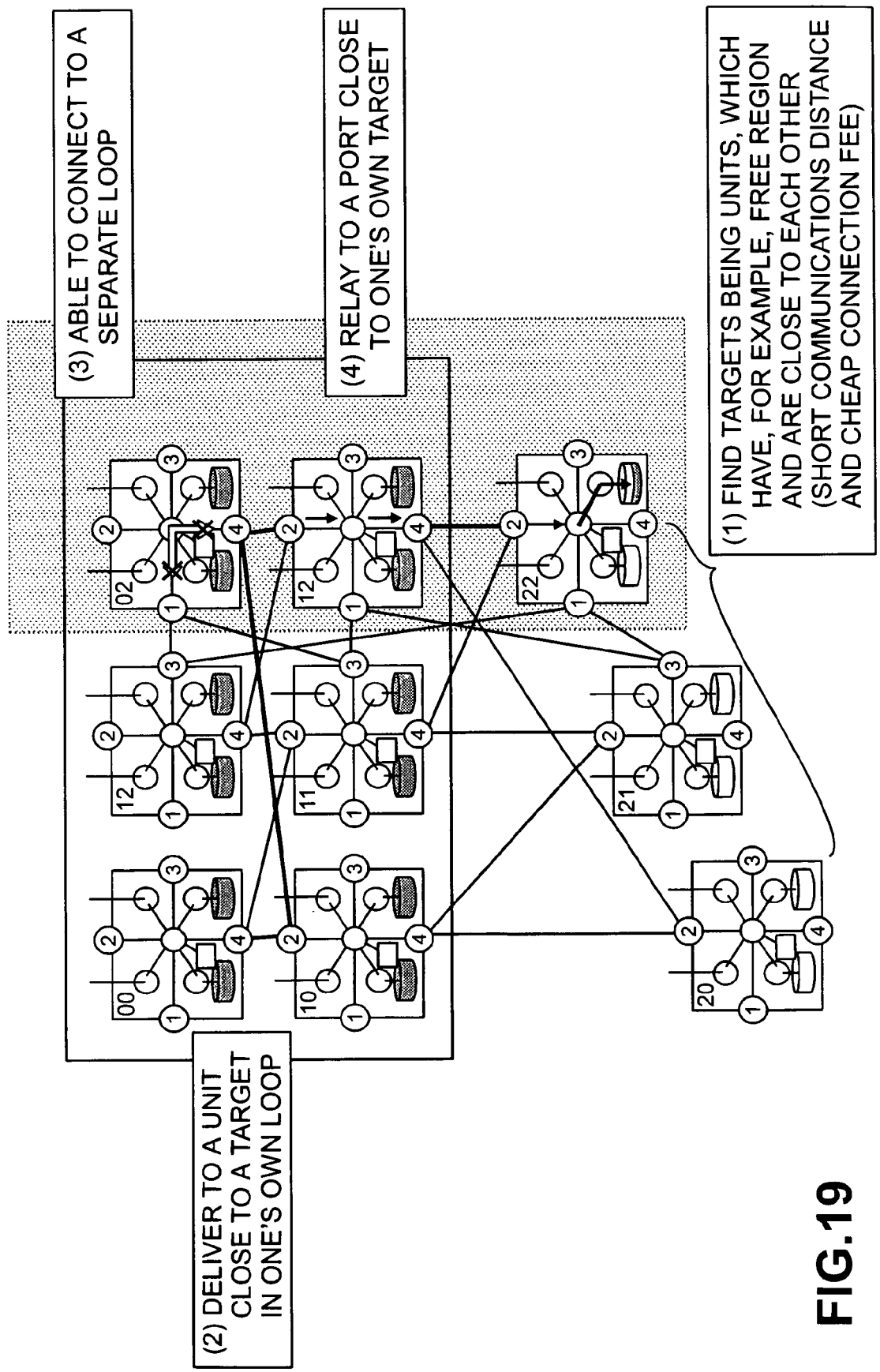
FIG. 19 is an explanatory drawing illustrating a concrete example of an operation, in which a transmission destination is determined, according to an embodiment of the invention.

FIG. 19 is an explanatory drawing illustrating a concrete example of an operation, in which a transmission destination is determined.

First, when it is desired that a unit '00' shown in FIG. 19 transfers data to another unit, a unit is selected trying to transfer the data to a unit '20', a unit '21', and a unit '22', to which the unit '00' has ever been connected.

(1) For example, let assume that a unit of first ranking among the three units in a list of targets having free region and being near (short communications distance and cheap connection fee) be the unit '22'.

And assuming the unit '22' to be a target address, (2) data are transferred to the nearest unit in one's own loop.

More specifically, (00, 4) has a connection with (10, 2) loop-connected thereto, and a unit '10' relays the data to the loop to transfer the same to a unit '02'.

Then after being transferred to (02, 4), the unit '02' selects (02, 1) in a separate loop via an internal switch unit 5 to (3) be able to have a connection with the separate loop the loop is not selected in this case, but to transfer the data to (12, 2) as it is, judging that load is large in the loop, or transfer via the same loop is efficient.

Also, a unit '12' transfers the data to (12, 4) to (4) a connecting adapter 100, which is close to the unit "22" being a target, via an internal switch unit 5, and the unit "22" being a target receives the data via (22, 2) to store the same in one's own unit because of its capability of storage, and transfers such reception to the unit '00'.

Subsequently, an optional function in transfer via a disk storage unit being a relay unit is described.

Figure 20:
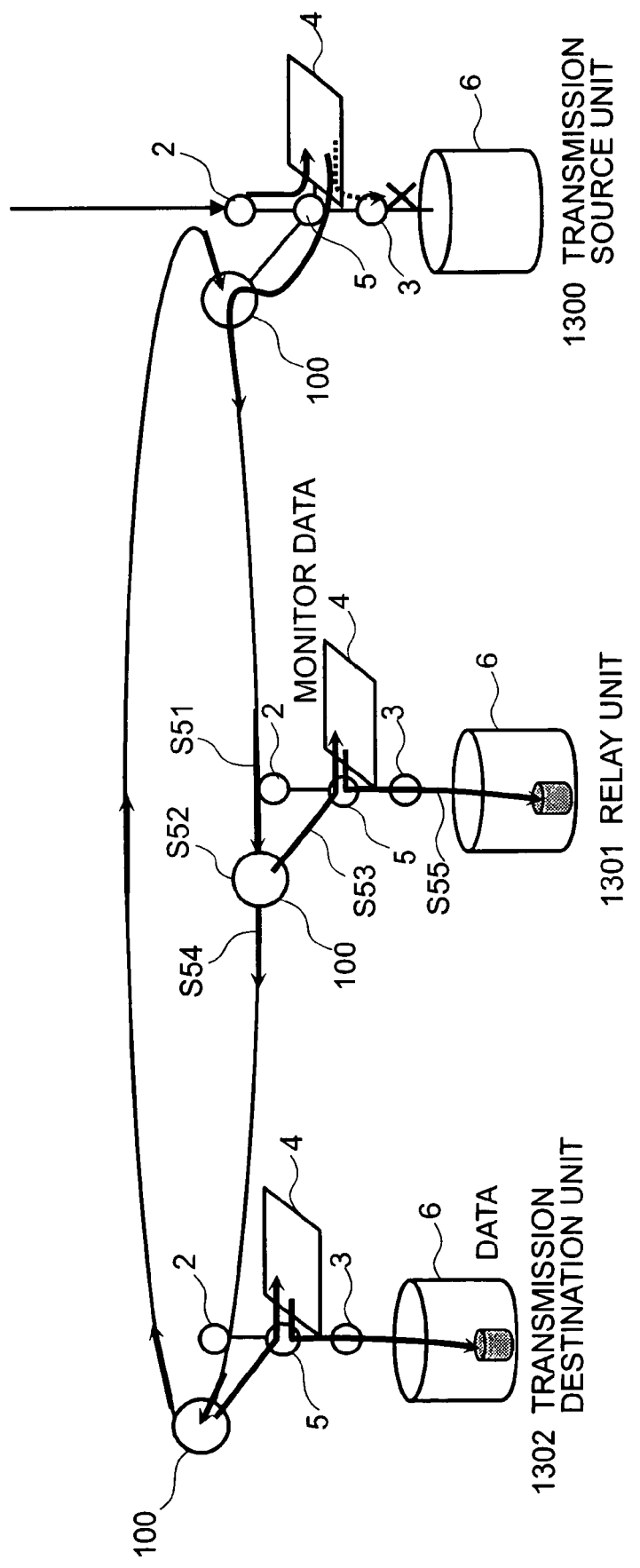
FIG. 20 is an explanatory drawing illustrating an operation, in which a relay unit monitors data at the time of relay, according to an embodiment of the invention.
Figure 21:
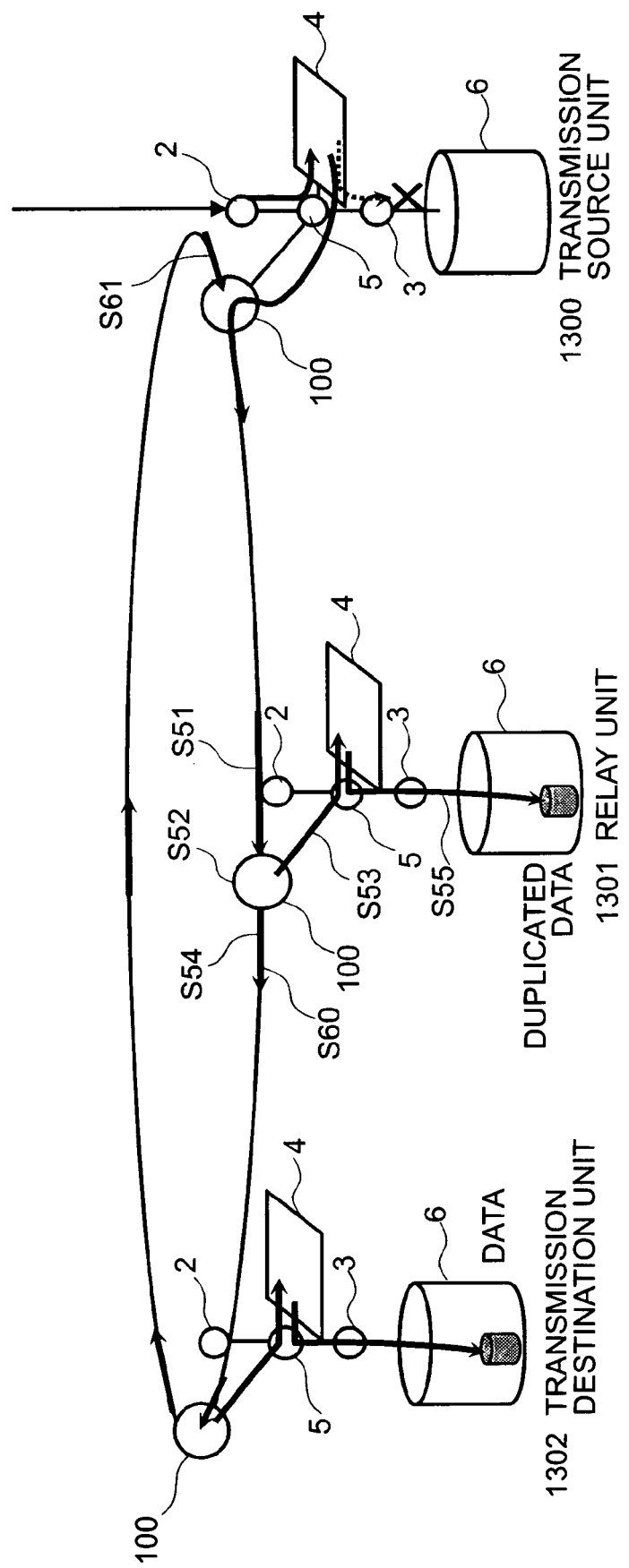
FIG. 21 is an explanatory drawing illustrating an operation, in which data monitored by a relay unit are registered in a separate volume, according to an embodiment of the invention.
Figure 22:
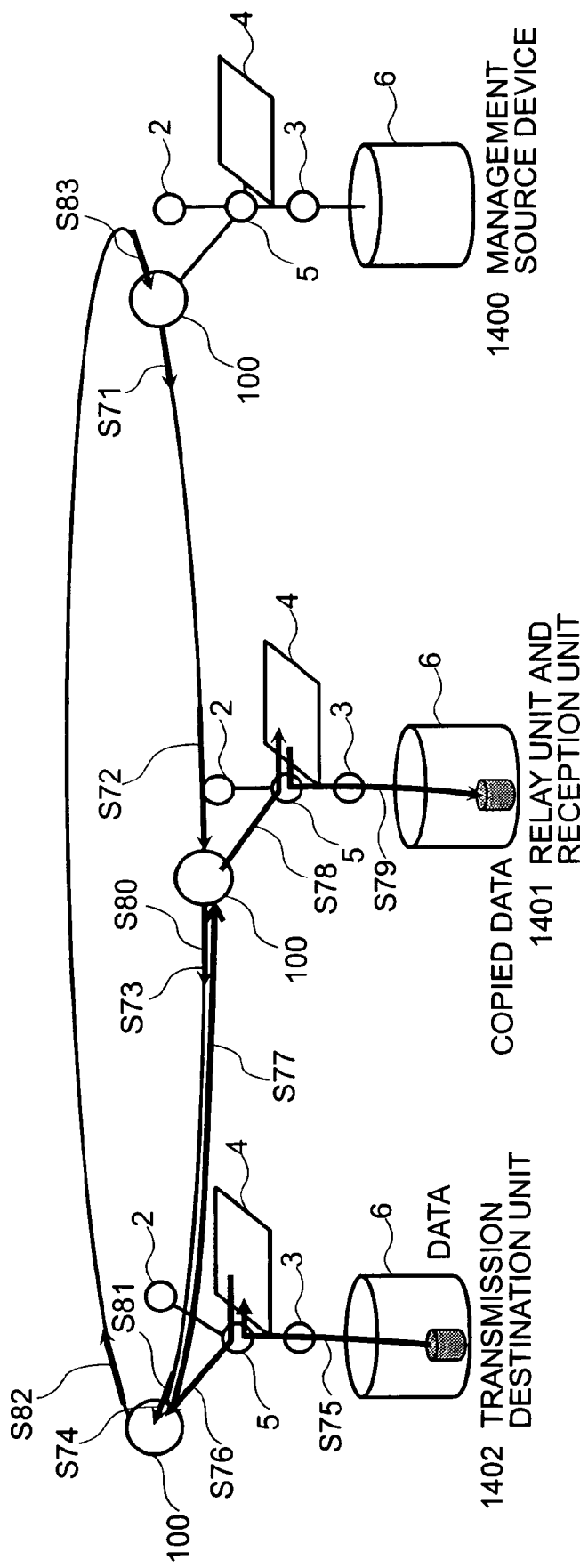
FIG. 22 is an explanatory drawing illustrating an operation, in which another unit swaps destination data, according to an embodiment of the invention.

FIG. 20 is an explanatory drawing illustrating an operation, in which a relay unit monitors data at the time of relay, FIG. 21 is an explanatory drawing illustrating an operation, in which data monitored by the relay unit are registered in a separate volume, and FIG. 22 is an explanatory drawing illustrating an operation, in which another unit swaps destination data.

First, in the function of a relay unit for monitoring data, a relay unit 1301 receives data from a transmission source unit 1300 as shown in FIG. 20 (STEP 51).

Then the relay unit 1301 having received data analyzes an address (STEP 52), and essentially causes the data to be hopped and transmitted because of a unit ID being not one's own (STEP 54), but carries out writing on a cache memory unit 4 in parallel at the time of such functioning (STEP 53). Also, the address is allocated to an in-unit logical address.

Then destaging from the cache memory unit 4 to the groups of magnetic disks 6 is performed (STEP 55).

STEP 53 and STEP 54 can be executed in parallel by, for example, opening an output of the selector 109, shown in FIG. 4, to the packet buffers 107 and the path I/F units 108 in a direction of transmission. Even in the case where one of, for example, the relay units 1301 loses data, such monitored data can be also used in tracing a history and taking out the data again from an intermediate relay unit 1301 for another transmission without performing retrying from a transmission source unit 1300.

Also, a plurality of units can check a data check cord. Also, the respective relay units 1301 can distribute the data in small volumes to have the data as log data.

Also, as the function of a relay unit for making monitored data in a separate volume for registration, a transmission source unit being a responsibility source must be informed of which relay unit 1301 to store duplication in the case where monitored data is managed as duplication of master data.

That is, a message (address update) is carried out as shown in FIG. 21 in addition to respective steps in monitoring of processings shown in FIG. 20, for example, an identifier '02' representative of a duplication destination unit is indicated in a map therein as an identifier 1003 among the storage destination address 1010 shown in FIG. 15 to be forwarded (STEP 60), and the transmission source unit 1300 performs writing once on an address map in conformity to a message of address update of a transmission destination unit 1302 (STEP 61). Also, when it is desired that data of the duplication destination be made a separate volume, a host logical ID is updated into another on a host side to achieve updating of an address map in a storage unit whereby actualization thereof can be attained.

Also, as the function of swapping destination data to another unit (between-unit duplication), a management destination unit affords data duplication between units (original data is scrapped after duplication in the case of movement) in the case where it is desired that data stored in another unit be positively moved to a separate unit (for example, in the case where it is desired that a different group of units be appointed due to variation in traffic on a network and accounting).

First, in the case where it is desired that a management source device 1400 duplicate data present in a transmission destination unit 1402 to a relay unit and reception unit 1401, a command header issued from the management source device 1400 and shown in FIG. 13 appoints a phase ID as "20: between-unit transfer", and a command is received, in which a destination address is appointed as an address of the relay unit and reception unit 1401 and a source address is appointed as an address of the transmission destination unit 1402 in the between-unit data address format 1111 shown in FIG. 14 (STEP 71).

Then a connecting adapter 100 of the relay unit and reception unit 1401 receives the command (STEP 72) to transfer the command to the transmission destination unit 1402 (STEP 73), and the transmission destination unit 1402 receives the command to analyze the same as duplication between units (STEP 74) to read data for appointment of the management source device 1400 in one's own unit, from the groups of magnetic disks 6 (STEP 75), reads the data via the cache memory unit 4 (STEP 76), and transmits the data to the relay unit and reception unit 1401 (STEP 77).

Then the relay unit and reception unit 1401 receives and stores the data in the cache memory unit 4 (STEP 78), stores the data in a region in one's own unit (STEP 79), and transmits the stored results to the management source device 1400 (STEP 80), and the management source device 1400 goes through STEP 81 and STEP 82 to confirm completion of whole substituted duplication (STEP 83).

Also, at this time, the data may be transmitted from the relay unit and reception unit 1401 to the management source device 1400 in a reverse direction to report completion (the relay unit and reception unit 1401 may decide a transmission destination).

By supporting the between-unit duplication, data having been distributed to extend can be rearranged in a purposeful arrangement as possible, so that a further flexible data management is made possible.

As described above, according to the embodiment, since disk storage units themselves autonomously carry out processings of data transmission between a plurality of disk storage units and management information of the data is retained in the respective disk storage units, storage of data can be complemented among the disk storage units without the provision of an exclusive device for managing those disk storage units, which constitute a disk storage system, and that disk storage unit, which cannot promptly accommodate an increase in data amount, rents a capacity from another disk storage unit, thereby enabling reducing deterioration in service.

Also, addresses and data can be also delivered in order between disk storage units and the respective disk storage units can relay and transmit data therebetween without the provision of any special switches between the disk storage units.

Also, a unique protocol can be carried out between the disk storage units without influence on hosts, the respective disk storage units can independently accede to demands from host computers while cooperating with one another, and it is possible to realize a relatively easy storage pool of inexpensive operating cost.

Also, when a disk storage unit operates as a relay unit, it monitors passing data and distributes and stores duplicated data and transmission log, whereby it is possible to expect an effect of lightening in backup.

Also, since there is no need of provision of a master server for managing data in a plurality of disk storage units and an accumulation device for accumulating data stored in a plurality of disk storage units to output data according to a request from the disk storage units, it is possible to reduce a standing operating cost required for management of a master server and an accumulation device.

In addition, while an example, in which disk storage units are autonomous, is described in the embodiment, the invention is not limited to disk storage units but applicable to an arrangement, in which a plurality of switches and other information processing devices connect to one another to be autonomous, these elements being included in disk storage units.

In this case, each of switches and other information processing devices is similar in configuration to and operates in a similar manner to those of disk storage units according to the embodiment.

I claim:

1. A disk storage system comprising a plurality of disk storage units, each disk storage unit comprising:
   a plurality of host interfaces coupled to a plurality of host computers;
   a plurality of disk interfaces coupled to disk devices for storing data;
   a cache memory configured to temporarily store the data and allow access thereto to be gained from the host interfaces and the disk interfaces;
   a switch component configured to couple the host interfaces, the disk interfaces, and the cache memory;
   wherein each of the plurality of disk storage units maintains information about the plurality of disk storage units in a respective communication interface thereof, the communication interfaces coupling the plurality of disk storage units;
   wherein each of the plurality of disk storage units executes the processing of data transmissions between the plurality of disk storage units,
   wherein management information including information about a logical volume of a disk storage unit of a data transfer destination having been subjected to the processing of transmissions is retained in the communication interface of the each of the disk storage units,
   wherein the logical volume is related to a plurality of disk devices in the disk storage unit of the data transfer destination,
   wherein when the disk storage unit of the data transfer destination receives the data transferred from a first disk array unit of a data transfer source, the disk storage unit of the data transfer destination in a second disk array unit stores the data in a cache memory therein and transmits the management information including the information about the logical volume of the disk storage unit of the data transfer destination to the disk storage unit of the data transfer source in the first disk array unit,
   wherein when the processing of the data transmissions between the plurality of disk storage units is executed, the switch component is configured to transmit the data with address swapping or without address swapping, and
   wherein the plurality of disk storage units are configured to perform inquiries to other disk storage units, retain information about loaded states and residual capacities of the other disk storage units in the disk interfaces of each of the disk storage units, and based on the information about the loaded states and residual capacities of the other disk storage units, prepare groups of addresses used for swapping the address to transmit the data.

2. The disk storage system according to claim 1, wherein the processing of data the transmissions between the plurality of disk storage units is executed based on results of analysis of demands for data from the host computers or other disk storage units and the management information.

3. The disk storage system according to claim 1, wherein when the processing of the data transmissions between the plurality of disk storage units is executed, an address of the data is swapped with an address of a disk storage unit that is a transmission destination to execute the processing of the transmissions.

4. The disk storage system according to claim 1, wherein when the processing of the data transmissions between the plurality of disk storage units is executed, data being transmitted are stored in the cache memory, and when a first disk storage unit assigned as a first transmission destination is in an undesirable state, a first address of the data stored in the cache memory is replaced with a second address of a second disk storage unit to execute the processing of the data transmissions the second disk storage unit being a second transmission destination.

5. The disk storage system according to claim 1, wherein the processing of the data transmissions between the plurality of disk storage units is executed based on a state of storage regions of the disk devices in the disk storage units.

6. A disk storage unit comprising:
   a plurality of host interfaces coupled to a plurality of host computers;
   a plurality of disk interfaces coupled to disk devices for storing data;
   a cache memory configured to temporarily store the data and allow access thereto from the host interfaces and the disk interfaces;
   a switch to couple the host interfaces, the disk interfaces, and the cache memory;
   a data transmission component coupled to at least two other disk storage units to execute the processing of data transmissions between the data transmission component and the other disk storage units;
   a communication interface for maintaining information on the other disk storage units and a plurality of disk storage units coupled to the other disk storage units and for maintaining management information including information about a logical volume of a disk storage unit of a data transfer destination having been subjected to the processing of transmissions by the data transmission component;
   wherein the logical volume is related to a plurality of disk devices in the disk storage unit of the data transfer destination;
   wherein when the disk storage unit of the data transfer destination receives the data transferred from a first disk array unit of a data transfer source, the disk storage unit of the data transfer destination in a second disk array unit stores the data in a cache memory therein and transmits the management information including the information about the logical volume of the disk storage unit of the data transfer destination in the second disk array unit to the disk storage unit of the data transfer source in the first disk array unit;
   wherein when the processing of the data transmissions between the plurality of disk storage units is executed, the data transmission means selects whether the transmissions are executed with address swapping or without address swapping; and
   wherein the data transmission means performs inquiries to other disk storage units, retains information about loaded states and residual capacities of the other disk storage units in the disk interfaces of each of the disk storage units, and based on the information about the loaded states and residual capacities of the other disk storage units, prepares groups of addresses used for swapping the address to transmit the data.

7. The disk storage unit according to claim 6, wherein the data transmission component comprises an address analysis component for analyzing an address of the data, the data transmission component using the address analysis component to analyze demands for data from the host computers or the other disk storage units to execute the processing of the data transmissions based on results of the analysis and the management information.

8. The disk storage unit according to claim 7, wherein the data transmission component comprises an address conversion component for conversion of an address of the data, wherein the data transmission component uses the address analysis component to analyze demands for data from the host computers or from a first disk storage unit coupled to the communication interface, and uses the address conversion component to replace the address of the data with an address of a second disk storage unit coupled to the communication interface based on results of the analysis and the management information to execute the processing of the transmissions.

9. The disk storage unit according to claim 8, wherein when the processing of the data transmissions is executed between the disk storage unit and the other disk storage units, the data transmission component stores data being transmitted in the cache memory and replaces an address of the data stored in the cache memory with an address of a disk storage unit that is coupled to the communication interface as a second transmission destination if a disk storage unit coupled to the communication interface as a first transmission destination experiences a problem, so that the processing of the transmissions are capable of being executed.

10. The disk storage unit according to claim 6, wherein the data transmission component executes the processing of data the transmissions based on a storage region of the disk device within the disk storage unit.

11. The disk storage unit according to claim 10, wherein the data transmission component and the switch are mounted on the same printed board.

12. The disk storage unit according to claim 10, wherein the address conversion component is mounted on the switch.

13. A disk storage system comprising a plurality of disk storage units, each disk storage unit, comprising:
a plurality of host interfaces connected to host computers;
disk interfaces connected to disk devices for storing data;
a cache memory configured to temporarily store the data and to which access can be gained in common from the host interfaces and the disk interfaces;
a switch component to couple the host interfaces, the disk interfaces, and the cache memory;
wherein each of the plurality of disk storage units comprises a data transmission component to execute the processing of data transmission between the plurality of disk storage units and a communication interface for retaining information on the plurality of disk storage units and management information including information about a logical volume of a disk storage unit of a data transfer destination having been subjected to the processing of the transmissions by the data transmission component, wherein the plurality of disk storage units are connected to one another in a loop formation via the communication interfaces;
wherein the logical volume is related to a plurality of disk devices in the disk storage unit of the data transfer destination;
wherein when the disk storage unit of the data transfer destination receives the data transferred from a first disk array unit of a data transfer source, the disk storage unit of the data transfer destination in a second disk array unit stores the data in a cache memory therein and transmits the management information including the information about the logical volume of the disk storage unit of the data transfer destination in the second disk array unit to the disk storage unit of the data transfer source in the first disk array unit;
wherein when the processing of the data transmissions between the plurality of disk storage units is executed, the switch component is configured to transmit the data with address swapping or without address swapping; and
wherein the plurality of disk storage units are configured to perform inquiries to other disk storage units, retain information about loaded states and residual capacities of the other disk storage units in the interfaces of each of the disk storage units, and based on the information about the loaded states and residual capacities of the other disk storage units, prepare groups of addresses used for swapping the address to transmit the data.

14. The disk storage system according to claim 13, wherein each of the data transmission components of the plurality of disk storage units comprises an address analysis component for analyzing an address of the data and an address conversion component for conversion of an address of the data,
wherein each of the data transmission components of the plurality of disk storage units relays data to another adjacent disk storage unit if the address analysis component determines that a demand for data from an adjacent disk storage unit is not stored on its own disk storage unit,
wherein the each of the data transmission components acknowledges whether access can be gained to data in a drive device of its own disk storage unit if the address analysis component determines that a demand for data from an adjacent disk storage unit is stored on its own disk storage unit, and performs storage or taking-out of the data to provide management information to a disk storage unit that is a demand source if access can be gained to data in the drive device of its own disk storage unit, and performs swapping of an address of the data to relay the data to another adjacent disk storage unit if access cannot be gained to data in the drive device of its own disk storage unit.

15. The disk storage system according to claim 14, wherein each of the data transmission components of the plurality of disk storage units replaces an address with an address of an optional disk storage unit in a loop if an address of data is to be subjected to swapping.

16. The disk storage system according to claim 15, wherein each of the data transmission components of the plurality of disk storage units, respectively, specifies a group in a predetermined list to select an optional unit in the loop.

17. The disk storage system according to claim 16, wherein out-unit fitting parts are connected to the communication interfaces of the plurality of disk storage units to connect the plurality of disk storage units in a loop therethrough, and
wherein when one of the disk storage units or the communication interfaces of the disk storage units experiences a problem, connection of an adjacent disk storage unit and another adjacent disk storage unit is bypassed by the out-unit fitting parts.

* * * * *